United States Patent
Iimoto et al.

(10) Patent No.: US 7,110,134 B2
(45) Date of Patent: Sep. 19, 2006

(54) FACSIMILE SYSTEM

(75) Inventors: Keiichi Iimoto, Kawaguchi (JP); Ken Kuroda, Yokohama (JP); Eiichiro Kitagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/428,082

(22) Filed: May 2, 2003

(65) Prior Publication Data

US 2003/0202217 A1    Oct. 30, 2003

Related U.S. Application Data

(62) Division of application No. 09/519,667, filed on Mar. 6, 2000, now Pat. No. 6,608,696, which is a division of application No. 07/969,343, filed on Oct. 30, 1992, now Pat. No. 6,157,463.

(30) Foreign Application Priority Data

Nov. 7, 1991 (JP) .................... 3-291125
Oct. 1, 1992 (JP) .................... 4-263406

(51) Int. Cl.
*G06F 15/00* (2006.01)
*H04N 1/32* (2006.01)

(52) U.S. Cl. ..................... 358/1.15; 358/442
(58) Field of Classification Search ................ 358/440, 358/402, 442, 444, 400, 1.15, 405, 434, 404; 379/100.01

See application file for complete search history.

(56) References Cited

U.S. PATENT DOCUMENTS

| | | | |
|---|---|---|---|
| 3,958,088 A * | 5/1976 | Vieri .................. | 379/100.13 |
| 4,746,986 A | 5/1988 | Tanigawa .............. | 358/256 |
| 4,941,170 A | 7/1990 | Herbst ................. | 379/100 |
| 4,969,184 A | 11/1990 | Gordon et al. ........ | 379/100 |
| 5,014,221 A * | 5/1991 | Mogul ................ | 358/1.14 |
| 5,046,027 A * | 9/1991 | Taaffe et al. ........ | 345/557 |
| 5,054,096 A | 10/1991 | Beizer ............... | 382/41 |
| 5,065,254 A | 11/1991 | Hishida .............. | 358/400 |
| 5,079,765 A | 1/1992 | Nakamura ............. | 370/85.13 |
| 5,081,539 A | 1/1992 | Kaneko ............... | 358/437 |
| 5,151,895 A * | 9/1992 | Vacon et al. ......... | 370/420 |
| 5,163,088 A | 11/1992 | LoCascio ............. | 379/95 |

(Continued)

FOREIGN PATENT DOCUMENTS

DE        3733650        4/1988

(Continued)

OTHER PUBLICATIONS

Arisawa et al., "FICS 2 Facsimile Storage and Conversion Software System (STOC-201)", Rev. Electrical Comm. Lab., vol. 33, No. 1, Jan. 31, 1985, pp. 21-30.

(Continued)

*Primary Examiner*—Madeleine A V Nguyen
(74) *Attorney, Agent, or Firm*—Fitzpatrick, Cella, Harper & Scinto

(57) ABSTRACT

In a facsimile system having a server device connected to a local-area network system, to which a plurality of client terminals are connected, and connected also to an ISDN and a pay-station telephone network, the server device performs communication with the pay-station telephone network and the plurality of client terminals, performs communication with the ISDN and the plurality of client terminals, and changes over communication between the ISDN and the pay-station telephone network in accordance with a command from each of the plurality of client terminals.

7 Claims, 23 Drawing Sheets

U.S. PATENT DOCUMENTS

| | | | | |
|---|---|---|---|---|
| 5,179,651 | A | * 1/1993 | Taaffe et al. | 345/555 |
| 5,189,525 | A | 2/1993 | Kotani | 358/407 |
| 5,191,525 | A | 3/1993 | LeBrun et al. | 364/419 |
| 5,196,943 | A | 3/1993 | Hersee et al. | 358/403 |
| 5,200,993 | A | 4/1993 | Wheeler et al. | 379/96 |
| 5,283,665 | A | 2/1994 | Ogata | 358/434 |
| 5,374,998 | A | * 12/1994 | Iida | 358/486 |
| 5,384,835 | A | 1/1995 | Wheeler et al. | 379/96 |
| 5,548,814 | A | * 8/1996 | Lorang et al. | 370/310 |
| 5,881,168 | A | * 3/1999 | Takaoka et al. | 382/180 |
| 6,064,491 | A | * 5/2000 | Matsumoto | 358/1.15 |

FOREIGN PATENT DOCUMENTS

| | | |
|---|---|---|
| EP | 0378694 | 7/1990 |
| GB | 2240691 | 8/1991 |
| JP | 54-078039 A | 6/1979 |
| JP | 55-110469 | 8/1980 |
| JP | 58-027243 | 2/1983 |
| JP | 2-202171 | 8/1990 |
| JP | 2-213271 | 8/1990 |
| JP | 5-282231 | 10/1993 |
| JP | 6-85952 | 3/1994 |
| WO | 9111874 | 8/1991 |

OTHER PUBLICATIONS

Isoyama et al., "Private Facsimile Mail Trend", NTT Rev. vol. 3, No. 2, Mar. 1, 1991, p. 26-33.

Hanaki et al., "An Interworking Mechanism Between LAN and WAN and Implementation Method", Microprocessing and Microprogramming EUROMICRO '89, vol. 28, No. 1/5, pp. 59-62 (Mar. 1990).

Schepers, "Design of a LAN/ISDN Gateway", Philips Telecommunication and Data Systems B.V., Hilversum, NL, Abstract and Chapter 4 (May 19, 1989).

Thomas, et al., "Diamond: A Multimedia Message System Built on a Distributed Architecture", Computer, vol. 18, No. 12, pp. 65-78 (Dec. 1985).

Katsuki, "Enhanced Facsimile Communication Network", Japan Telecommunications Review, vol. 28, No. 1, pp. 30-35 (Jan. 1986).

Klos, "E-mail in der Unternehmenskommunikation", NTZ Nachrichten Technische Zeitschrift, vol. 43, No. 6 (Jun. 1990).

Pat. Abs. Jp., vol. 15, No. 390, Oct. 3, 1991 (JP-A-3158060).

Schepers, et al., "LAN/WAN Interworking in the OSI Environment", Computer Networks and ISDN Systems, vol. 23, No. 4, pp. 253-266 (Jan. 1992).

* cited by examiner

FACSIMILE SYSTEM

This application is a division of application Ser. No. 09/519,667, filed on Mar. 6, 2000, now U.S. Pat. No. 6,608,696 which is a divisional of application Ser. No. 07/969,343, filed on Oct. 30, 1992 now U.S. Pat. No. 6,157,463. The entire disclosure of each prior application is incorporated herein by reference.

BACKGROUND OF THE INVENTION

1. Field of the Invention

This invention relates to server-type facsimile system. More particularly, the invention relates to a client-server facsimile system composed of a plurality of client terminals connected to a local-area network (hereinafter referred to as a "LAN") system, and a server device connected to the LAN system and also, through an ISDN or pay-station telephone network, to a facsimile machine such as a G4 or G3 facsimile machine.

2. Description of the Prior Art

The transmitting of a document, which has been created and edited at a terminal device, to another ISDN or pay-station telephone network via a modem is prior art. However, a conventional terminal device having a data communication function of this kind cannot be shared by a plurality of client terminals on a LAN even if it is connected to the LAN, and therefore the device serves merely as a dedicated communication terminal. In addition, since the device is dedicated to G4 or G3 facsimile communication, it cannot be changed over between the G4 and G3 modes.

Further, the transmitting of a document, which has been created and edited at a terminal device such as a personal computer or work station, to another ISDN or pay station telephone network via a communication interface port or communication adapter is prior art. However, a conventional terminal device having a data communication function of this kind cannot be shared and managed by a plurality of client terminals such as personal computers or work stations on a LAN even if it is connected to the LAN, and therefore the device serves merely as a dedicated communication terminal. In addition, since the device is dedicated to G4 or G3 facsimile communication, a selection cannot be made between the G4 and G3 modes.

In conventional facsimile transmission, there is a client-server facsimile system in which a plurality of client terminals are connected to a LAN, and in which a server device having a file storing function is connected to a wide-area network (WAN). According to this facsimile system, the server device is instructed to directly transmit files that are within a client terminal, the server device stores the files temporarily, converts them into facsimile data and then transmits the data. In this case, transmission requests from a plurality of clients are registered in a queue within the server. By virtue of this arrangement, files created at a plurality of personal computers or work stations can be transmitted by facsimile.

However, with the conventional client-server facsimile system, the conversion of a file into facsimile data is performed within the server device. Consequently, when it is attempted to temporarily store the file in the server device, a transmission error will be sent back if there is not enough storage capacity for the transmitted file to be stored. Until the request for storage is accepted, the operator must perform the required operation repeatedly.

Owing to the development of ISDN's in wide-area networks (WAN's), the use of G4 facsimile machines utilizing ISDN's has become more widespread. By connecting an ISDN to an ordinary pay-station telephone network (PSTN), the transmission and reception of image data between a G4 facsimile machine connected to the ISDN line and a G3 facsimile machine connected to the PSTN can be carried out.

Owing to the development of LAN's in computer networks, not only work stations but also personal computers may be connected to the network, and there is much transmission and reception of data among personal computers connected to LAN's. Owing to these circumstances, there is growing demand for an arrangement in which a WAN and a LAN may be connected together so that the transmission and reception of data can be carried out between devices connected to the respective networks. As a result, a facsimile system has appeared in which a WAN and a LAN are connected together and the transmission and reception of image data are performed between facsimile machines and work stations.

This server system is composed of at least one facsimile server device for communication, and any number of client work stations connected to the server via the LAN so as to utilize the server function.

When image data is transmitted from the facsimile machine to the client terminal connected to the server, the image data is received by the server, where it is stored temporarily. The server has a reception-notification function in which notification of the reception of data is sent to the work station on the client-terminal side which is the destination of the transmission.

With regard to this reception-notification function, designation of the client terminal connected to the server device is performed using a sub-address when the transmission is made form the facsimile machine to the server system. In order to specify the client which is the destination of the notification of reception, the server device users a conversion table which converts the sub-address present in the server device to the address of the client terminal.

When this facsimile server system is being utilized, there are occasions where it is desired to revise the address conversion table in the server device, as when one's own client terminal has been changed, or when it is desired to temporarily send a facsimile document to another terminal, or when it is desired to register a client terminal anew.

At such times, the conventional reception notification method is such that a revision in the contents of the table present in the server cannot be performed by the operator from the side of the client terminal. Instead, the operation is performed at the server. In order to make the revision, therefore, one must go to the location of the server. In addition, in a case where the r;erver device is operated by a general user, there is the danger that the system will be adversely affected by erroneous operation. When operation of the server device is performed only by the server manager, the manager must be relied upon for the purpose of revising the table. This means that the table cannot be revised when the manager is not present.

SUMMARY OF THE INVENTION

An object of the present invention is to provide a facsimile system in which the foregoing drawbacks of the prior art can be eliminated.

Another object of the present invention is to provide a facsimile system in which G4 and G3 facsimile communication functions possessed by a server device can be shared, and the load upon a client terminal can be alleviated by decentralizing the functions.

Still another object of the present invention is to provide a facsimile system in which G4 and G3 facsimile transmission/reception functions possessed by a server device can be shared in response to a service request command from each client terminal arranged in a LAN.

A further object of the present invention is to provide a facsimile system in which the load upon a client terminal can be alleviated.

A further object of the present invention is to provide a facsimile system in which facsimile transmission/reception from client terminals on a LAN can be managed.

Yet another object of the present invention is to provide a facsimile system in which it is possible to revise an address conversion table present in a server work station from the side of a client work station.

According to the present invention, there is provided a data processing apparatus. The apparatus includes: (1) a linker adapted to link to plurality of data terminals, each of which is able to store data to be processed; (2) receiving a processing request,from at least one of the plurality of data terminals without any request from the wherein the processing request indcludes information for specifying data to be processed that is predesignated by a data treminals and iformation for discriminating the data terminal from the plurality of data terminals: (3) a determiner adapted to determine whether predetermined resources are adequate to perform the received processing request; (4) a manager adapted to mange information for discriminating which data terminal of the plurality of data terminal has stored therein data to be processed corresponding to the received processing request; (5) requesting mean for issuing an output request to the discriminated data terminal for the data to be processed stored in the discriminated data terminal,based on the managed information, when the predetermined resources are adequated to perform the received processing request; (6) receiving mean for receiving the data to be processed, which is output from the discriminated data terminal, in accordance with the output request issued by the requesting means: and (7) a processor adapted to process the data received by the means for receiving the data to be processed, based on the received processing request.

According to another aspect of the present invention, there is provided a data processing apparatus for controlling data processing according to a processing request. The apparatus includes: (1) a linker adapted to link to a plurality of data terminals, each of which is able to store data to be processed: (2) a first receiver adapted to receive the processing request from each data terminal of the plurality of data terminals without any request from the apparatus, wherein the processing request includes information for specifying data that is predesignated to be processed by a data terminal and information for discriminating the data terminal from the plurality of data terminals: (3) an analyzer adapted to analyze the received processing request: (4) a manager adapted to manage information for discriminating which data terminal of the plurality of data terminals has stored therein data to be processed corresponding to the received processing request: and (5) requesting means for issuing an output request to the discriminated data terminal for the data to be processed stored in the discriminated data terminal, based on the managed information and the content of the analyzed processing request.

According to still another aspect of the present invention, there is provided a data processing apparatus. The apparatus includes: (1) a linker adapted to link to a plurality of data terminals, each of which is able to store data to be processed: (2) receiving means for receiving a processing request from at least one of the plurality of data terminals without any request from the apparatus, wherein the processing request includes information for specifying data to be processed that is predesignated by a data terminal and information for discriminating the data terminal from the plurality of data terminals: (3) a determiner adapted to determine whether predetermined resources are adequate to store data concerning the received processing request: (4) a manager adapted to manage information for discriminating which data terminal of the plurality of data terminals has stored therein data to be processed corresponding to the received processing request: (5) requesting means for issuing an output request to the discriminated data terminal for the data to be processed stored in the discriminated data terminal, based on the managed information, when the predetermined resources are adequate to store data concerning the received processing request: (6) receiving means for receiving the data to be processed, which is output from the discriminated data terminal, in accordance with the output request issued by the requesting means: and (7) a processor adapted to process the data received by the means for receiving the data to be processed, based on the received processing request.

Other features and advantages of the present invention will be apparent from the following description taken in conjunction with the accompanying drawings, in which like reference characters designate the same or similar parts throughout the figures thereof. dr

DESCRIPTION OF THE PREFERRED EMBODIMENTS

<First Embodiment>

Figure 1:
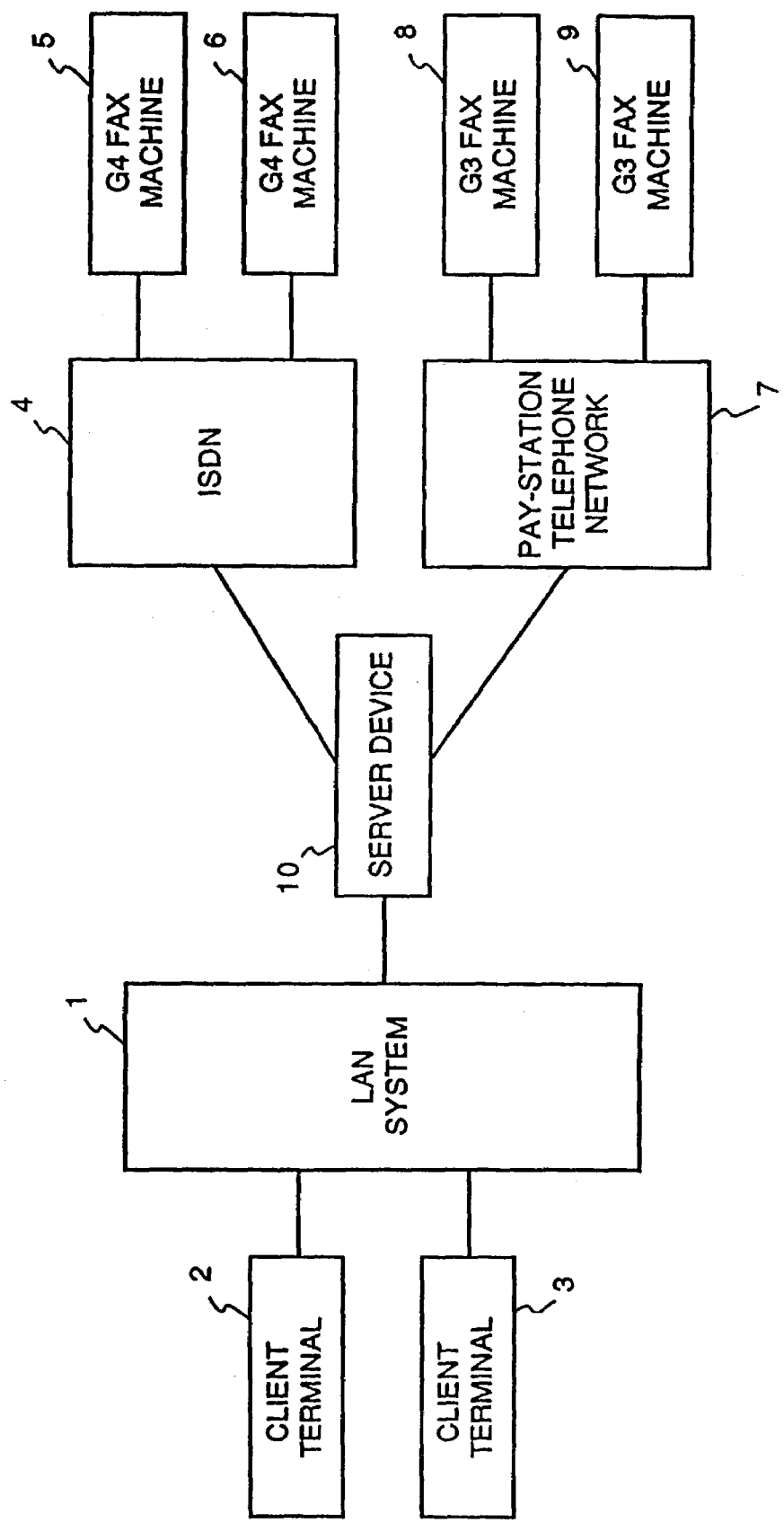
FIG. 1 is a block diagram showing the configuration of a network system having a client-server facsimile system according to a first embodiment of the present invention.

FIG. 1 is a block diagram showing the configuration of a network system having a client-server facsimile system according to a first embodiment of the present invention. As shown in FIG. 1, the network system includes a LAN system 1 having at least two channels, client terminals 2, 3 connected to the LAN system 1, an ISDN 4 to which are connected facsimile machines 5, 6 capable of communication in the G4 mode, a pay-station telephone network 7 to which are connected facsimile machines 8, 9 capable of communication in the G3 mode, and a server device 10 for realizing communication control according to this embodiment. The server device 10 performs allotted transmission of data from the LAN system 1 to the ISDN 4 and pay-station telephone network 7, as well as allotted transmission of data from the ISDN 4 and pay-station telephone network 7 to the LAN system 1.

Figure 2:
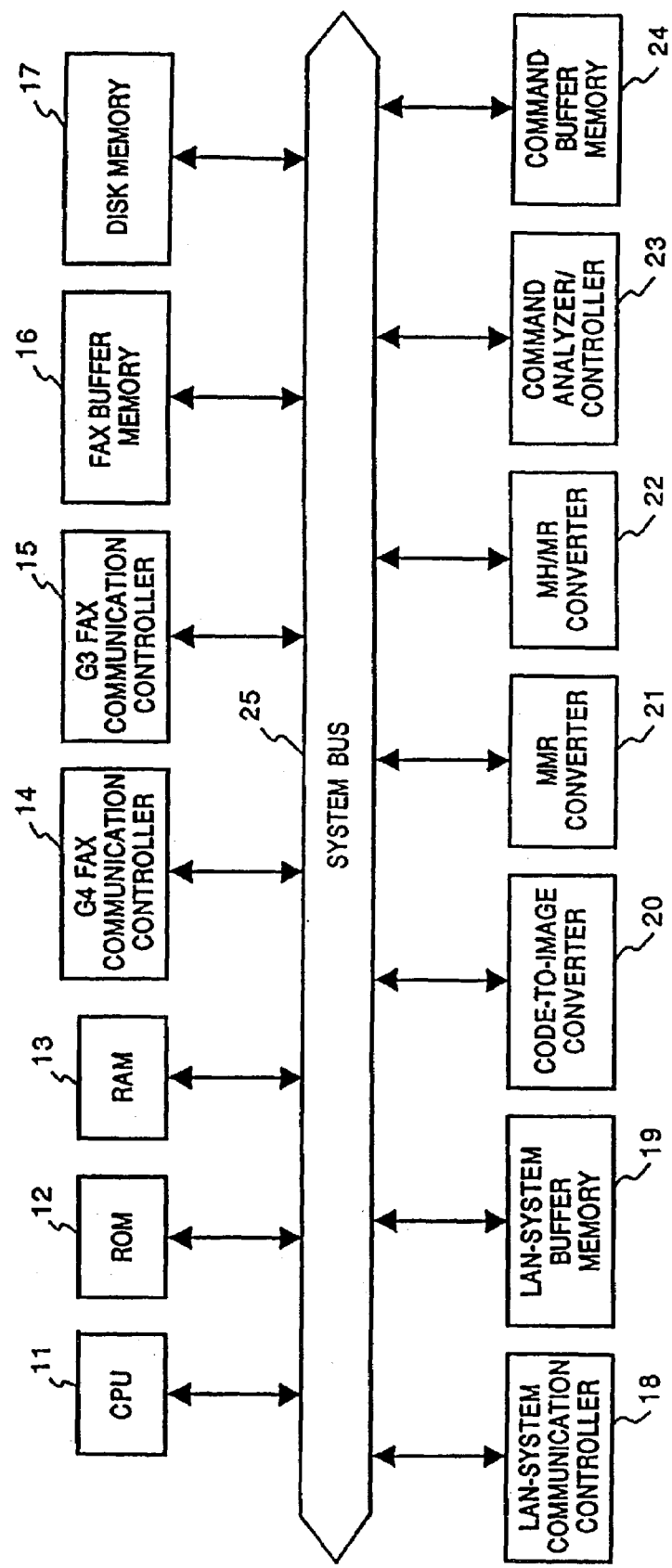
FIG. 2 is a block diagram showing the configuration of a server device according to the first embodiment.

FIG. 2 is a block diagram showing the configuration of the server device according to the first embodiment. As shown in FIG. 2, the server device includes a CPU 11 for performing overall control of the device in accordance with a control procedure shown, for example, in FIG. 4, and stored in a ROM 12. The latter stores programs such as one in accordance with the flowchart of FIG. 4. A RAM 13 is used as the work area of the CPU 11. Also included are a G4 facsimile-communication controller 14 for performing control in G4 facsimile communication, a G3 facsimile-communication controller 15 for performing control in G3 facsimile communication, and a buffer memory 16 for temporarily storing transmission/reception data at the time of G4/G3 facsimile data transmission/reception. The buffer memory 16 absorbs a difference is speed between the transmission speed of a disk file and network speed. A large-capacity disk memory 17 stores attribute information of each item of data.

A controller 18 for communication within the LAN system performs communication protocol control within the LAN system. Data transmitted via the communication controller 18 is developed in a buffer memory 19 within the LAN system. A code-to-image converter 20 develops a code document into a bit-map memory image. An MMR converter 21 compresses/decompresses data, which has been stored in the disk memory 17 by MMR, into a bit-map memory image. An MH/MR converter 22 compresses/decompresses data, which has been stored in the disk memory 17 by MH/MR, into a bit-map memory image.

A code document received from the LAN system 1 is developed into an image by the code-to-image converter 20 and the image is compressed by the MMR converter 21, after which the compressed image is stored in the disk memory 17.

A command analyzer and control unit 23 analyzes a command sent from a client terminal. If the command is, say, a G4-facsimile transmission command, the unit 23 sends a transmission command to the G4-facsimile communication controller 14. A command buffer memory 24 is a location for temporarily storing the command sent to the unit 23 from the client terminal. A system bus 25 connects the CPU 11 to the components 12 through 24.

Figure 3:
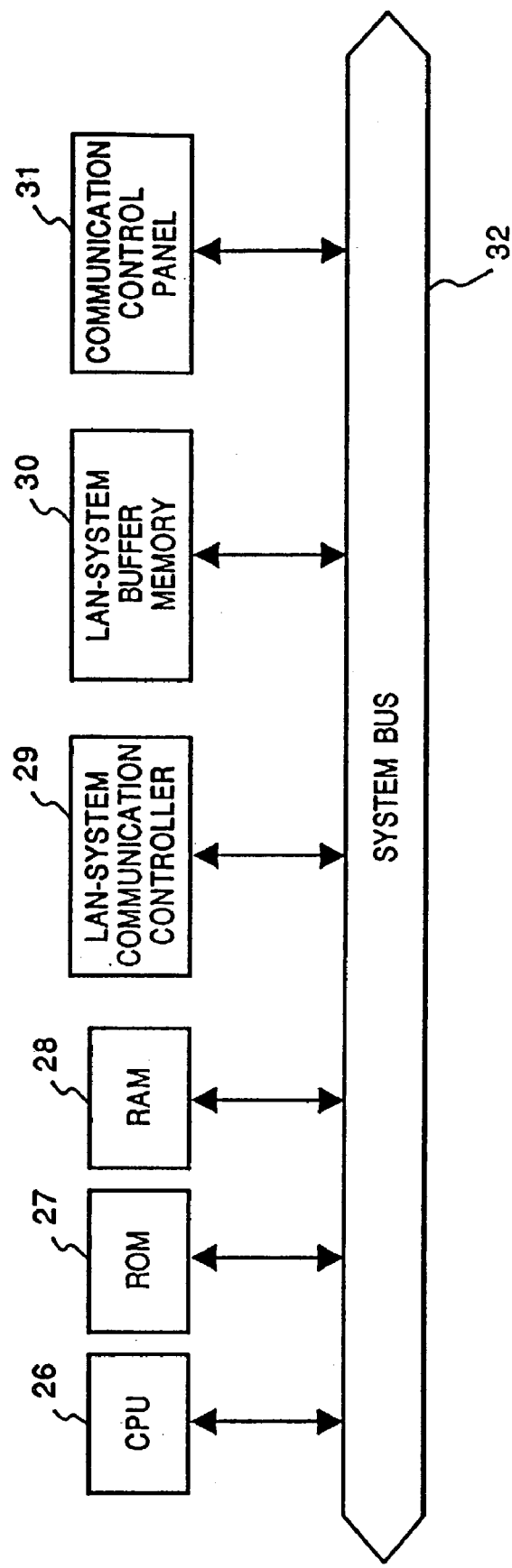
FIG. 3 is a block diagram showing the configuration of a client terminal according to the first embodiment.

FIG. 3 is a block diagram showing the construction of a client terminal according to the first embodiment. Since the client terminals 2, 3 are identical in construction, only the construction of the client terminal 2 will be described with reference to FIG. 3. The client terminal includes a CPU 26 for controlling the overall apparatus in accordance with a control procedure stored in a ROM 27, which stores various programs, and a RAM 28 used as a work area of the CPU 26. A controller 29 for communication within the LAN system performs communication protocol control within the LAN system. Data transmitted via the communication controller 29 is developed in a buffer memory 30 within the LAN system. A transmission control panel 31 sends transmission commands and the like to the server device 10 when a transmission operation is performed at the client terminal. A system bus 32 connects the CPU 26 to the components 27 through 31.

The main operation of the server device 10 according to the first embodiment will now be described.

Figure 4:
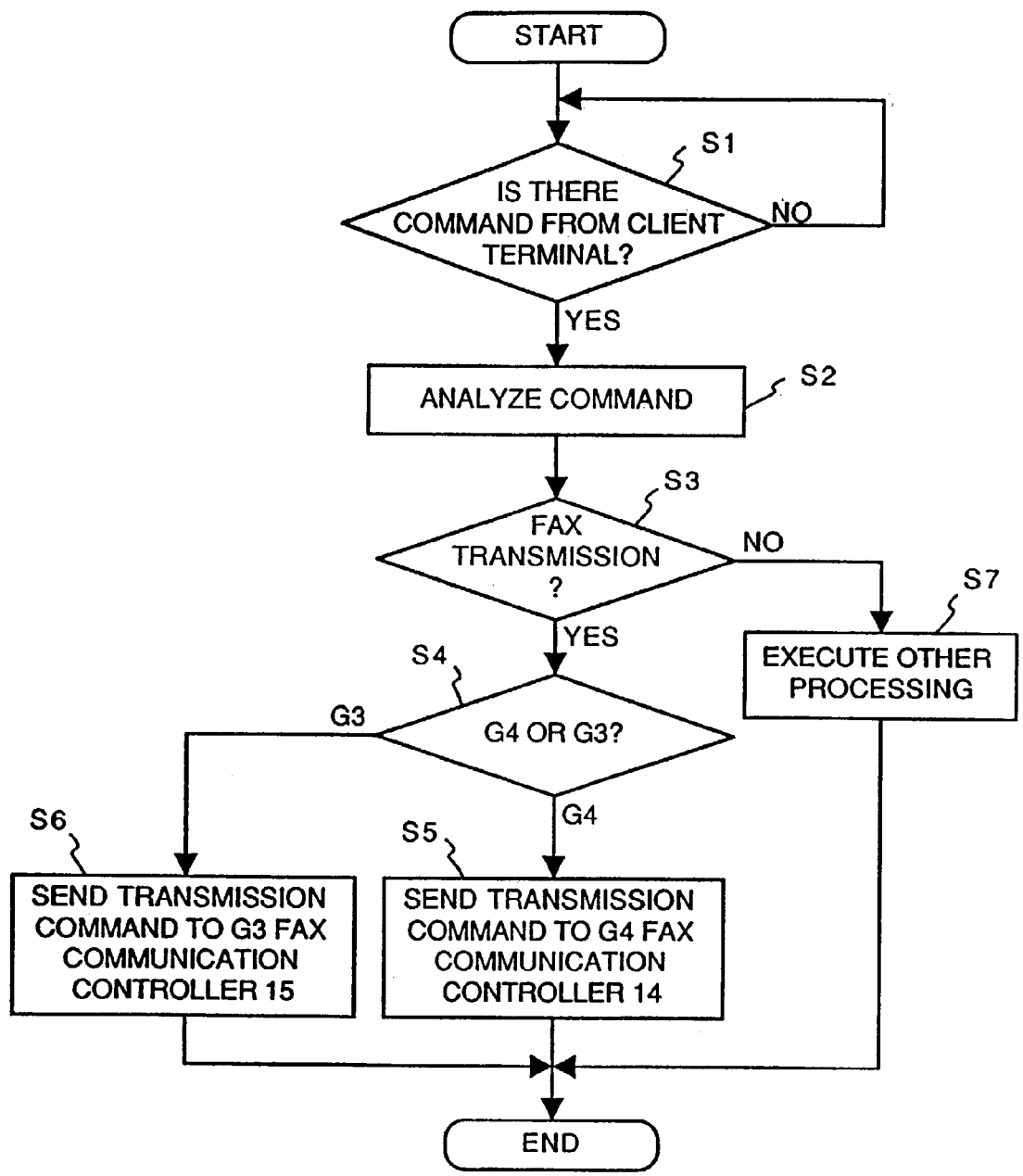
FIG. 4 is a flowchart for describing the operation of a command analyzer and control unit according to the first embodiment.

FIG. 4 is a flowchart for describing the operation of the command analyzer and control unit 23 according to the first embodiment.

In the flowchart of FIG. 4, the command analyzer and control unit 23 of the server device 10 waits for a request command from the client terminal 2 or 3 at step S1. If there is a command from a client terminal, the program proceeds to step S2, where the request command is analyzed. After the command is analyzed, it is determined at step S3 whether the command is indicative of facsimile transmission or not. If the answer is NO, then the program proceeds to step S7, at which other processing is executed, after which all processing is terminated. If it is found at step S3 that facsimile transmission has been requested, then the program proceeds to step S4, at which it is determined whether the transmission is for G4 facsimile or G3 facsimile. In case of G4 facsimile, a transmission command is sent to the G4 facsimile-communication controller 14 at step S5 and processing is terminated. In case of G3 facsimile, a transmission command is sent to the G3 facsimile-communication controller 15 at step S6 and processing is terminated.

Thus, in accordance with the first embodiment, as described above, a transmission operation may be performed at each of the client terminals arranged in the LAN system 1. As a result, the G4 and G3 facsimile communication functions possessed by the server device 10 can be shared. In addition, by decentralizing the functions, the load upon the client terminals can be alleviated.

<Second Embodiment>

Figure 5:
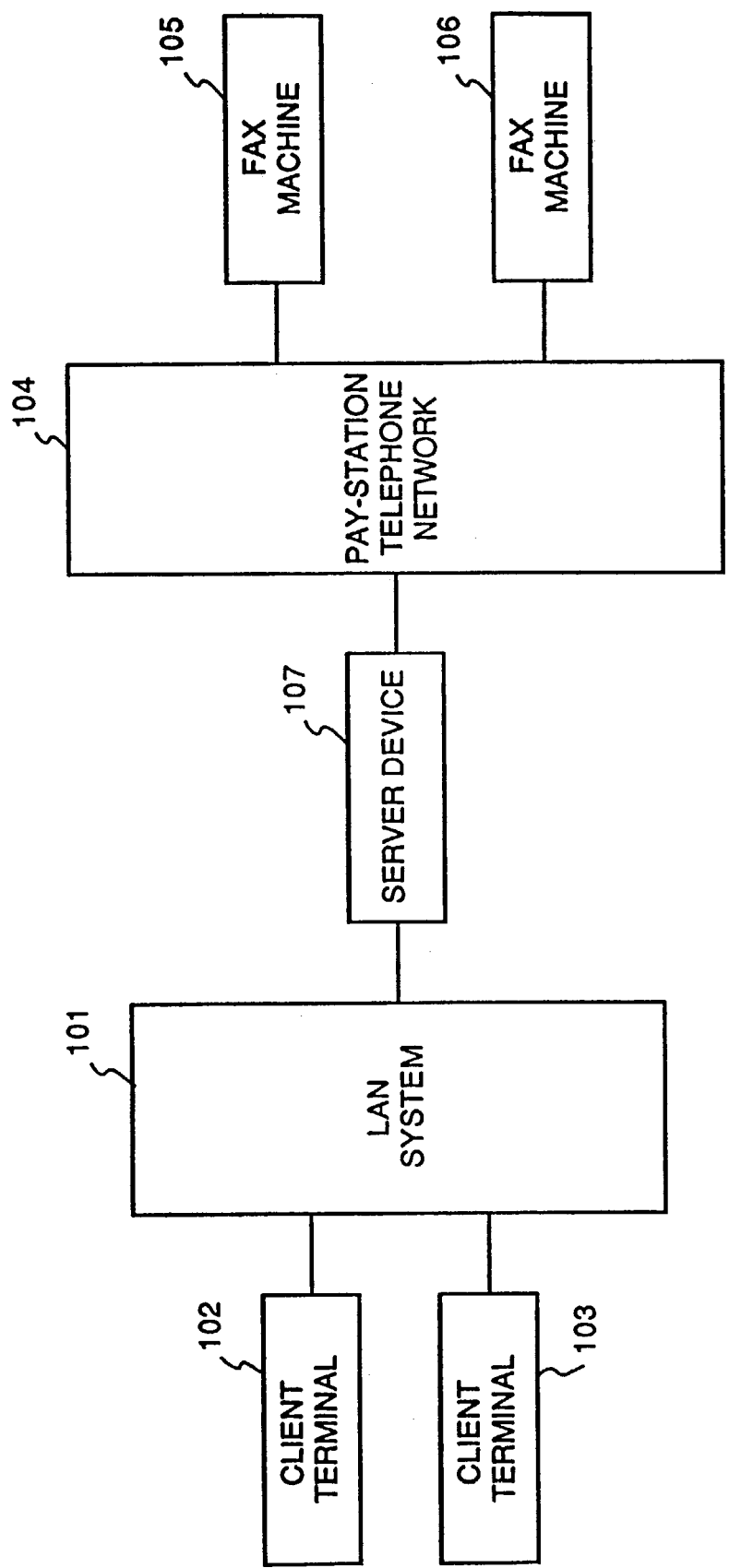
FIG. 5 is a block diagram showing the configuration of a network system having a client-server facsimile system according to a second embodiment of the present invention.

FIG. 5 is a block diagram showing the configuration of a network system having a client-server facsimile system according to a second embodiment of the present invention. As shown in FIG. 5, the network system includes a LAN system 101 having at least two channels, client terminals 102, 103 connected to the LAN system 101, a pay-station telephone network 104 to which are connected facsimile machines 105, 106 capable of communication in the G3 mode, and a server device 107 for realizing communication control according to this embodiment. The server device 107 performs processing for allotted transmission of data from the LAN system 101 to the pay-station telephone network 104, as well as for allotted transmission of data from the pay-station telephone network 104 to the LAN system 101.

Figure 6:
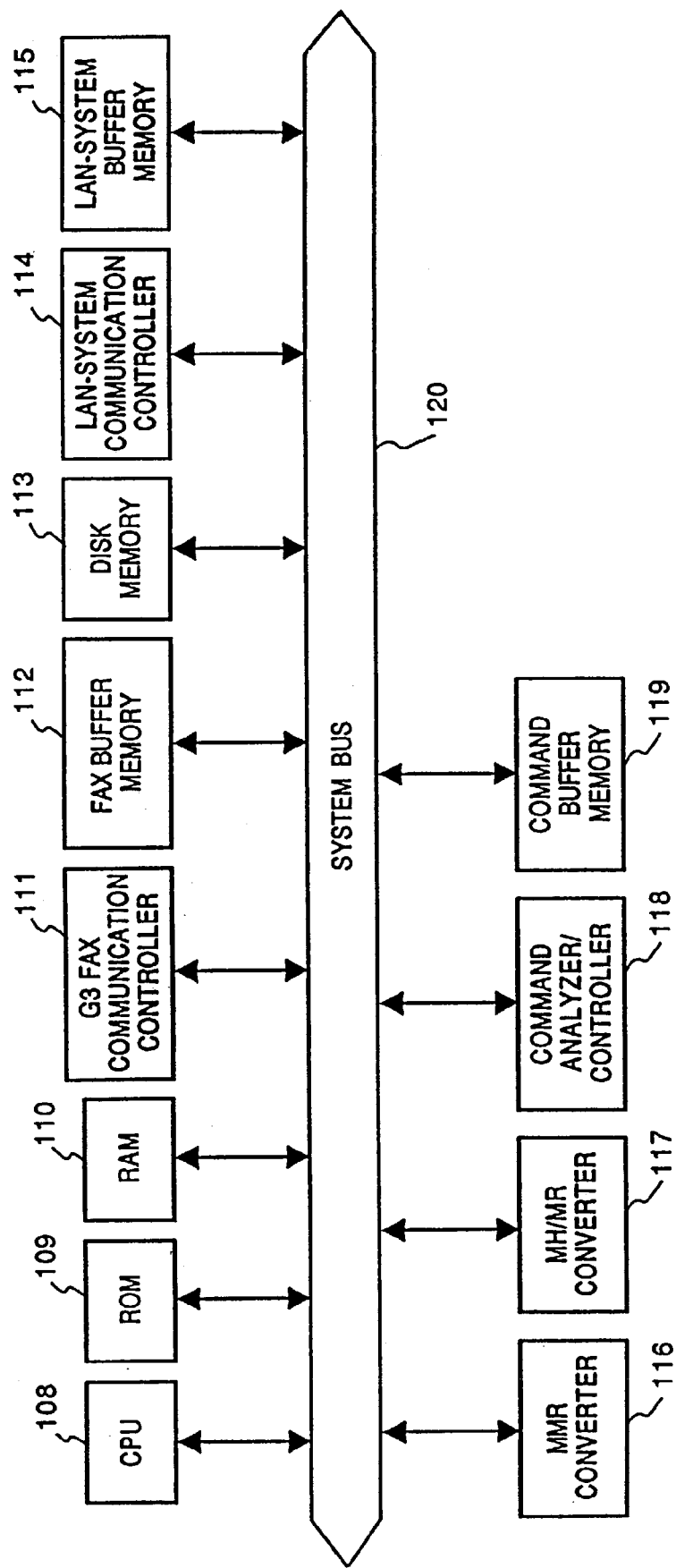
FIG. 6 is a block diagram showing the configuration of a server device according to the second embodiment.

FIG. 6 is a block diagram showing the configuration of the server device according to the second embodiment. As shown in FIG. 6, the server device includes a CPU 108 for performing overall control of the device in accordance with a control procedure shown, for example, in FIG. 8 and stored in a ROM 109. The latter stores programs such as one in accordance with the flowchart of FIG. 8. A RAM 110 is used as the work area of the CPU 108. Also included are a G3 facsimile-communication controller 111 for performing control in G3 facsimile communication, and a buffer memory 112 for temporarily storing transmission/reception data at the time of G3 facsimile data transmission/reception. The buffer memory 112 absorbs a difference is speed between the transmission speed of a disk file and network speed. A large-capacity disk memory 113 stores attribute information of each item of data.

A controller 114 for communication within the LAN system performs communication protocol control within the LAN system. Data transmitted via the communication controller 114 is developed in a buffer memory 115 within the LAN system. A code-to-image converter 116 develops a code document into a bit-map memory image. An MH/MR converter 117 compresses/decompresses data, which has been stored in the disk memory 113 by MH/MR, into a bit-map memory image.

A code document received from the LAN system 101 is developed into an image by the code-to-image converter 116 and the image is compressed by the MH/MR converter 117, after which the compressed image is stored in the disk memory 113.

A command analyzer and control unit 118 analyzes a command sent from a client terminal. If the command is, say, a facsimile transmission command, the unit 118 sends a transmission command to the G3-facsimile communication controller 111. A command buffer memory 119 is a location for temporarily storing the command sent to the unit 118 from the client terminal. A system bus 120 connects the CPU 108 to the components 109 through 119.

Figure 7:
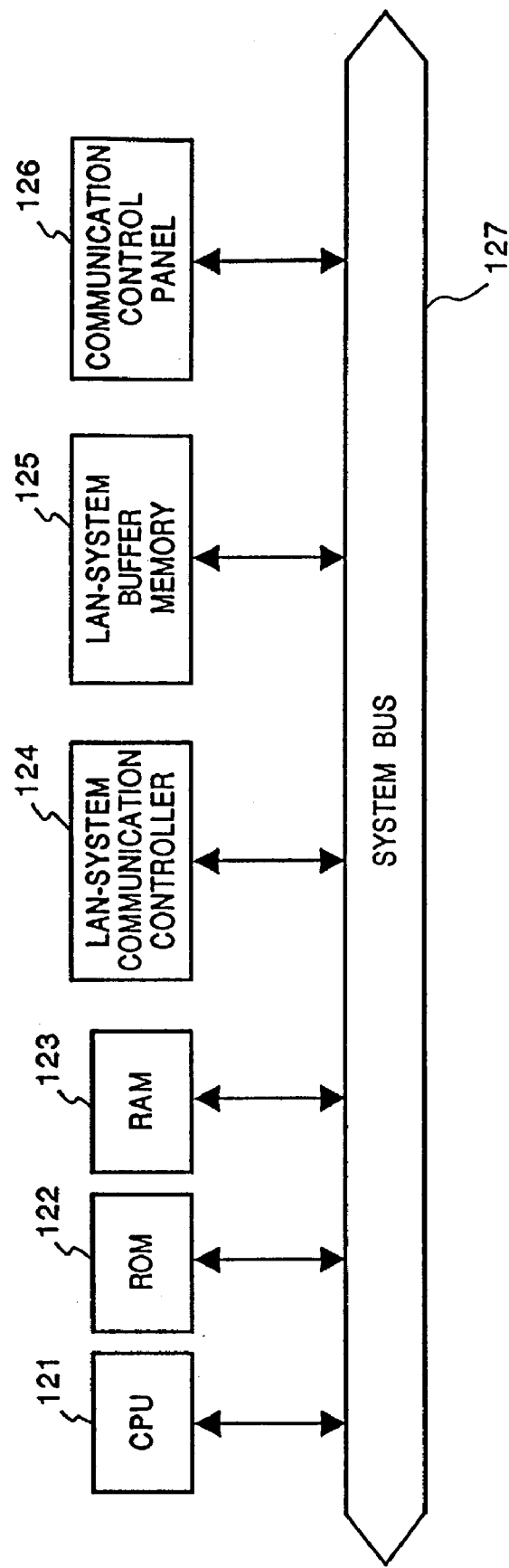
FIG. 7 is a block diagram showing the configuration of a client terminal according to the second embodiment.

FIG. 7 is a block diagram showing the construction of a client terminal according to the second embodiment. Since the client terminals 102, 103 are identical in construction, only the construction of the client terminal 102 will be described with reference to FIG. 7. The client terminal includes a CPU 121 for controlling the overall apparatus in accordance with a control procedure stored in a ROM 122, which stores various programs, and a RAM 123 used as a work area of the CPU 121. A controller 124 for communication within the LAN system performs communication protocol control within the LAN system. Data transmitted via the communication controller 124 is developed in a buffer memory 125 within the LAN system. A transmission control panel 126 sends transmission commands and the like to the server device 107 when a transmission operation is performed at the client terminal. A system bus 127 connects the CPU 121 to the components 122 through 126.

The main operation of the server device 107 according to the second embodiment will now be described.

Figure 8:
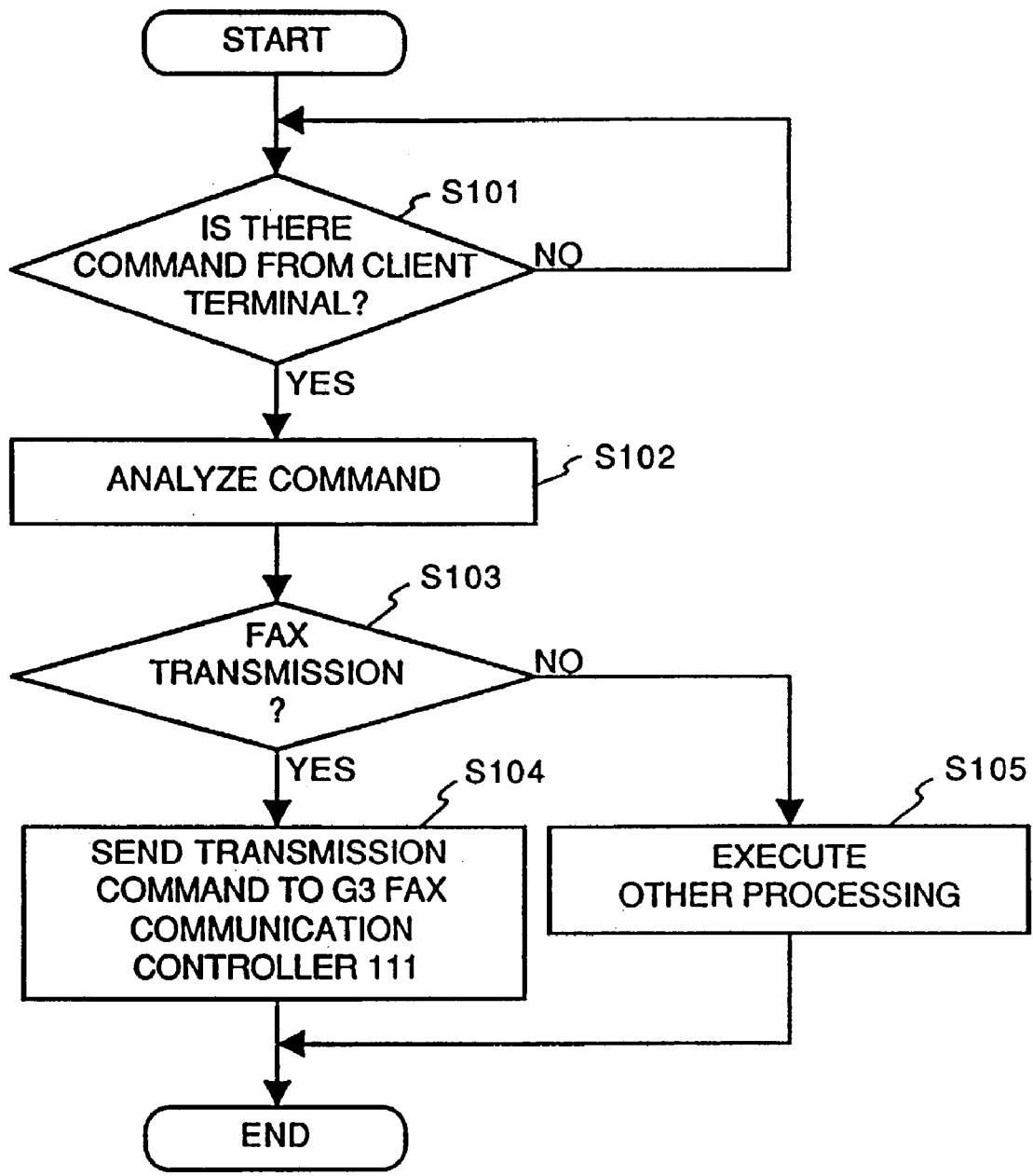
FIG. 8 is a flowchart for describing the operation of a command analyzer and control unit according to the second embodiment.

FIG. 8 is a flowchart for describing the operation of the command analyzer and control unit 118 according to the second embodiment.

In the flowchart of FIG. 8, the command analyzer and control unit 118 of the server device 107 waits for a request command from the client terminal 102 or 103 at step S101. If there is a command from a client terminal, the program proceeds to step S102, where the request command is analyzed. After the command is analyzed, it is determined at step S103 whether the command is indicative of facsimile transmission or not. If the answer is NO, then the program proceeds to step S105, at which other processing is executed, after which all processing is terminated. If it is found at step S103 that facsimile transmission has been requested, then the program proceeds to step S104, at which a transmission command is sent to the G3 facsimile-communication controller 111 and processing is terminated.

Thus, in accordance with the second embodiment, as described above, a transmission operation may be performed at each of the client terminals arranged in the LAN system 101. As a result, the G3 facsimile communication function possessed by the server device 107 can be shared. In addition, by decentralizing the functions, the load upon the client terminals can be alleviated.

<Third Embodiment>

Figure 9:
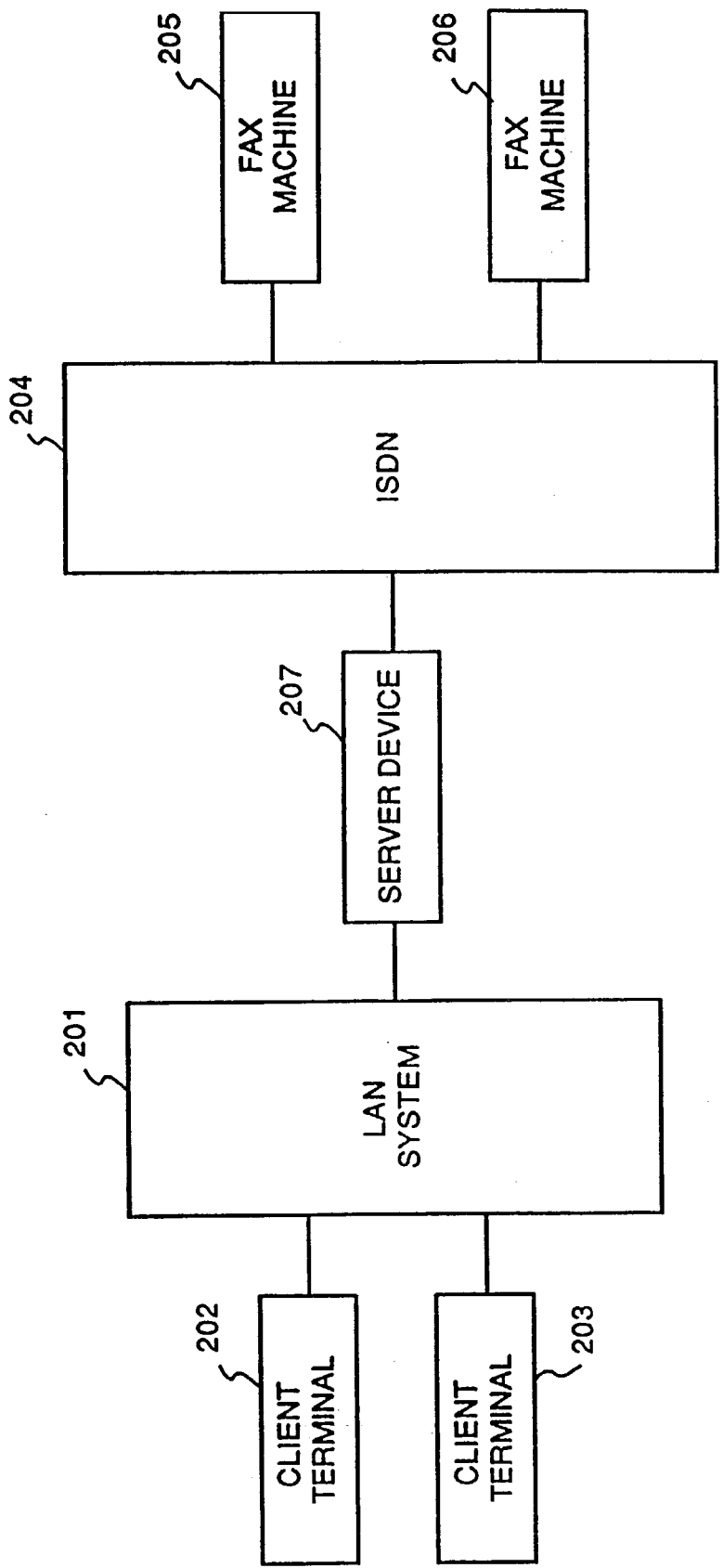
FIG. 9 is a block diagram showing the configuration of a network system having a client-server facsimile system according to a third embodiment of the present invention.

FIG. 9 is a block diagram showing the configuration of a network system having a client-server facsimile system according to a third embodiment of the present invention. As shown in FIG. 9, the network system includes a LAN system 201 having at least two channels, client terminals 202, 203 connected to the LAN system 201, an ISDN 204 to which are connected facsimile machines 205, 206 capable of communication in the G4 mode, and a server device 207 for realizing communication control according to this embodiment. The server device 207 performs processing for allotted transmission of data from the LAN system 201 to the ISDN 204, as well as for allotted transmission of data from the ISDN 204 to the LAN system 201.

Figure 10:
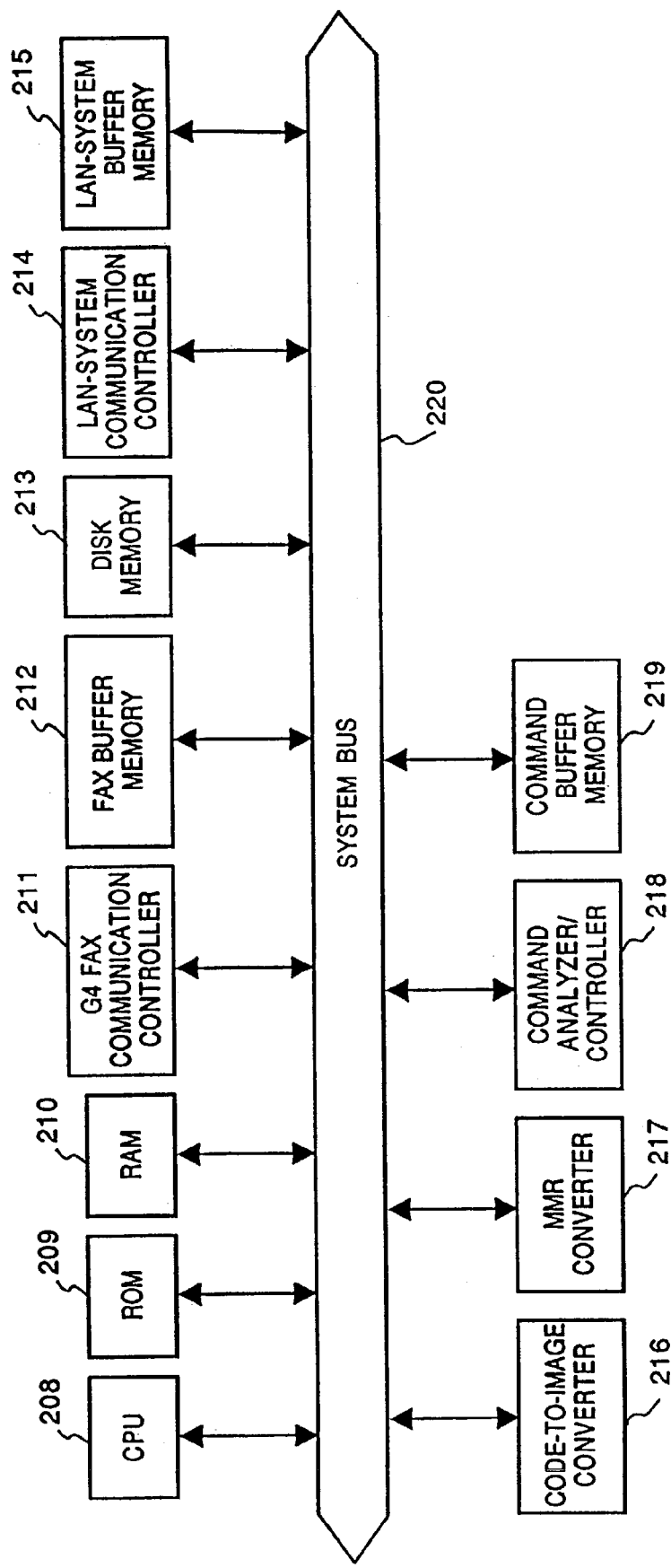
FIG. 10 is a block diagram showing the configuration of a server device according to the third embodiment.

FIG. 10 is a block diagram showing the configuration of the server device according to the third embodiment. As shown in FIG. 10, the server device includes a CPU 208 for performing overall control of the device in accordance with a control procedure (which includes the program shown in FIG. 12) stored in a ROM 209. The latter stores programs such as one in accordance with the flowchart of FIG. 12. A RAM 210 is used as the work area of the CPU 208. Also included are a G4 facsimile-communication controller 211 for performing control in G4 facsimile communication, and a buffer memory 212 for temporarily storing transmission/reception data at the time of G4 facsimile data transmission/reception. The buffer memory 212 absorbs a difference is speed between the transmission speed of a disk file and network speed. A large-capacity disk memory 213 stores attribute information of each item of data.

A controller 214 for communication within the LAN system performs communication protocol control within the LAN system. Data transmitted via the communication controller 214 is developed in a buffer memory 215 within the LAN system. A code-to-image converter 216 develops a code document into a bit-map memory image. An MMR converter 217 compresses/decompresses data, which has been stored in the disk memory 213 by MH/MR, into a bit-map memory image.

A code document received from the LAN system 201 is developed into an image by the code-to-image converter 216 and the image is compressed by the MMR converter 217, after which the compressed image is stored in the disk memory 213.

A command analyzer and control unit 218 analyzes a command sent from a client terminal. If the command is, say, a facsimile transmission command, the unit 218 sends a transmission command to the G4-facsimile communication controller 211. A command buffer memory 219 is a location for temporarily storing the command sent to the unit 218 from the client terminal. A system bus 220 connects the CPU 208 to the components 209 through 219.

Figure 11:
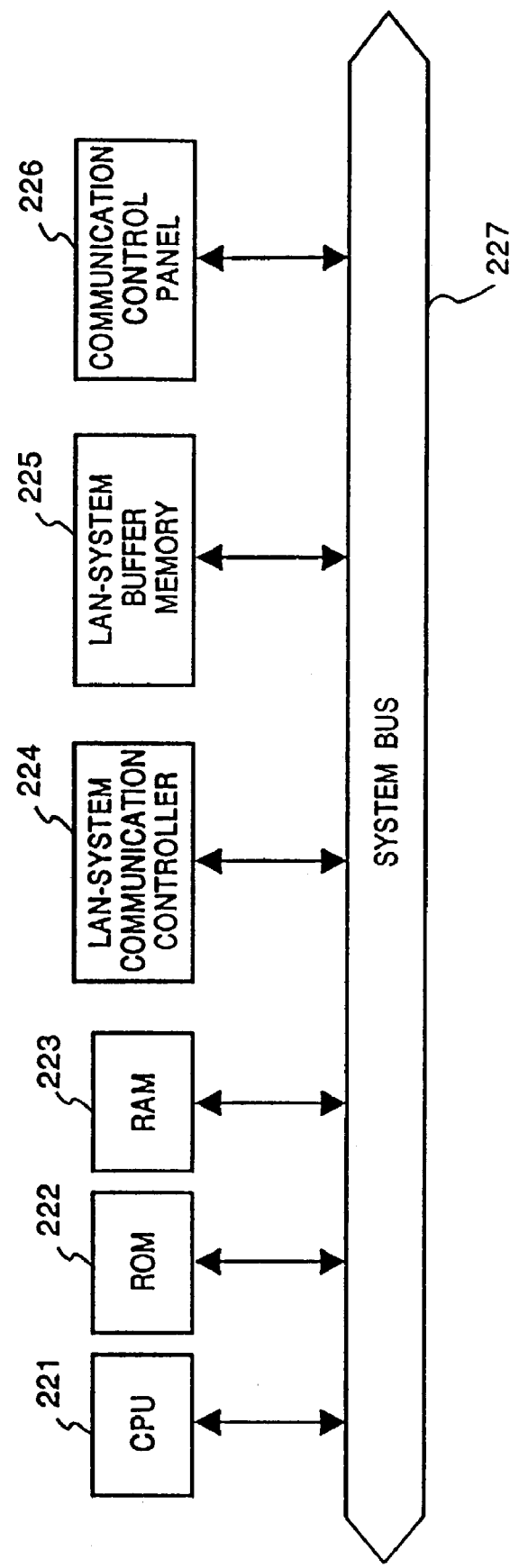
FIG. 11 is a block diagram showing the configuration of a client terminal according to the third embodiment.

FIG. 11 is a block diagram showing the construction of a client terminal according to the third embodiment. Since the client terminals 202, 203 are identical in construction, only the construction of the client terminal 202 will be described with reference to FIG. 11. The client terminal includes a CPU 221 for controlling the overall apparatus in accordance with a control procedure stored in a ROM 222, which stores various programs, and a RAM 223 used as a work area of the CPU 221. A controller 224 for communication within the LAN system performs communication protocol control within the LAN system. Data transmitted via the communication controller 224 is developed in a buffer memory 225 within the LAN system. A transmission control panel 226 sends transmission commands and the like to the server device 207 when a transmission operation is performed at the client terminal. A system bus 227 connects the CPU 221 to the components 222 through 226.

The main operation of the server device 207 according to the second embodiment will now be described.

Figure 12:
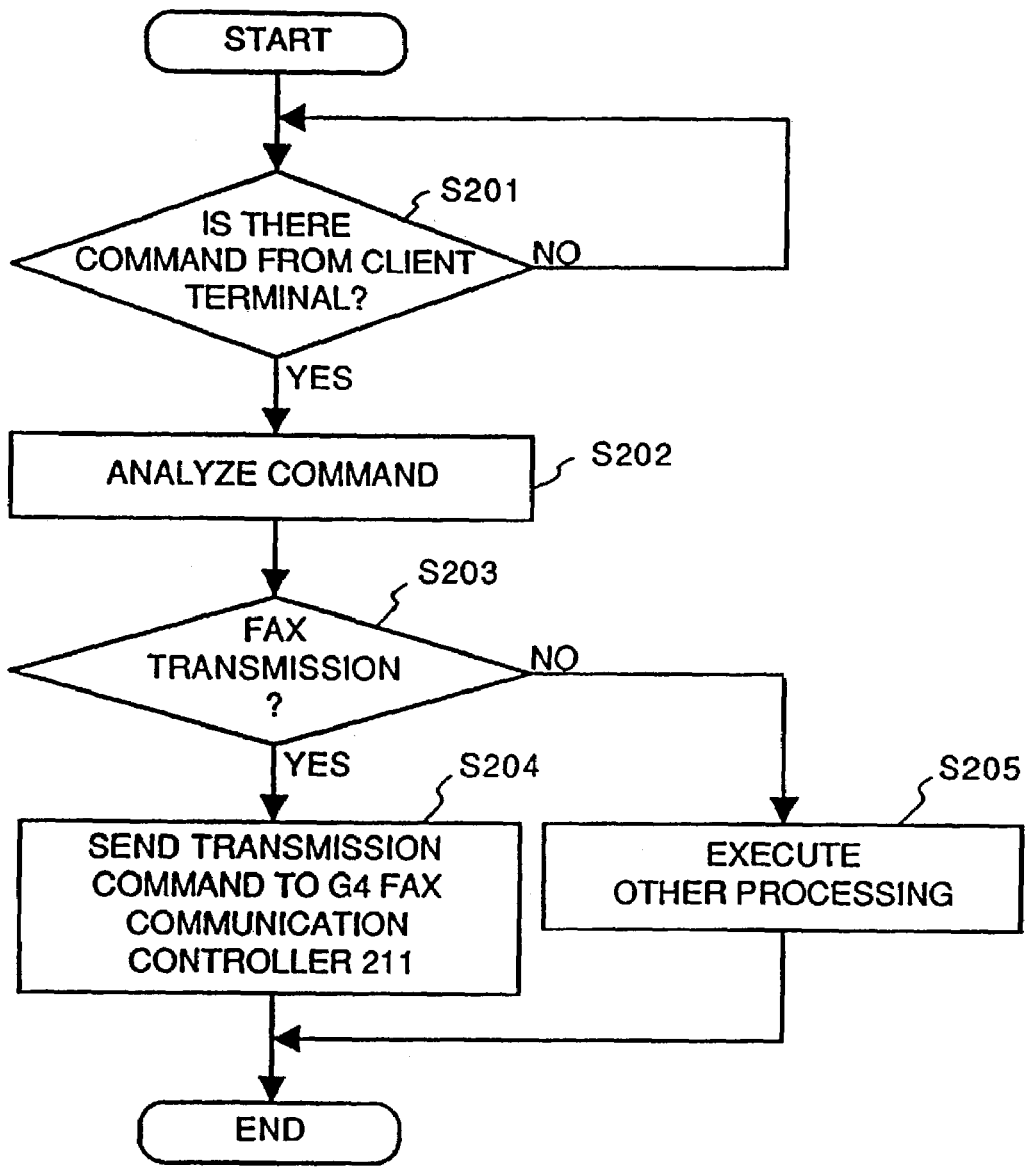
FIG. 12 is a flowchart for describing the operation of a command analyzer and control unit according to the third embodiment.

FIG. 12 is a flowchart for describing the operation of the command analyzer and control unit 218 according to the second embodiment.

In the flowchart of FIG. 12, the command analyzer and control unit 218 of the server device 207 waits for a request command from the client terminal 202 or 203 at step S201. If there is a command from a client terminal, the program proceeds to step S202, where the request command is analyzed. After the command is analyzed, it is determined at step S203 whether the command is indicative of facsimile transmission or not. If the answer is NO, then the program proceeds to step S205, at which other processing is executed, after which all processing is terminated. If it is found at step S203 that facsimile transmission has been requested, then the program proceeds to step S204, at which a transmission command is sent to the G4 facsimile-communication controller 211 and processing is terminated.

Thus, in accordance with the third embodiment, as described above, a transmission operation may be performed at each of the client terminals arranged in the LAN system 201. As a result, the G4 facsimile communication function possessed by the server device 207 can be shared. In addition, by decentralizing the functions, the load upon the client terminals can be alleviated.

<Fourth Embodiment>

Figure 13:
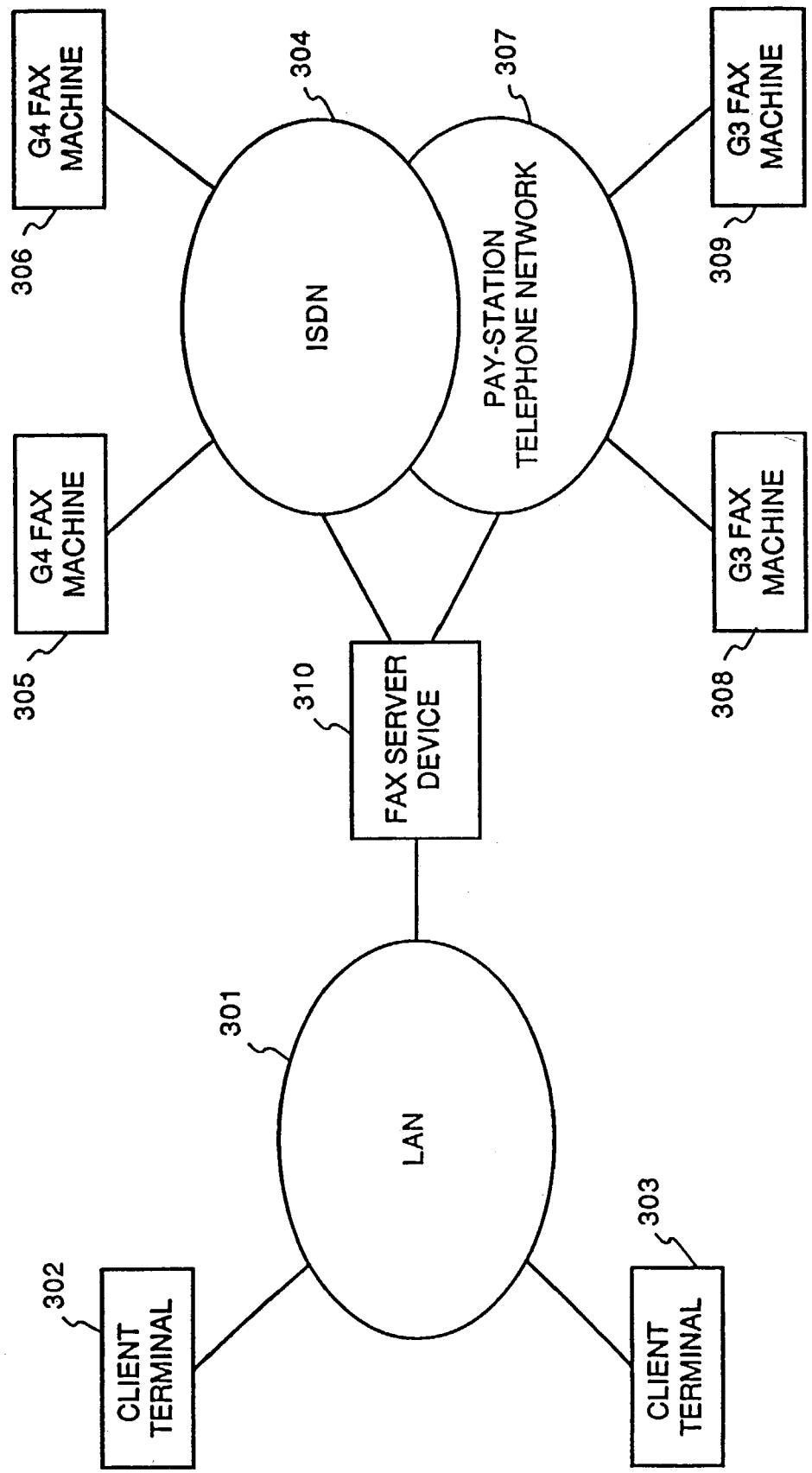
FIG. 13 is a block diagram showing the configuration of a network system according to a fourth embodiment of the present invention.

FIG. 13 is a block diagram showing the configuration of a network system which is connected a client-server facsimile system according to a fourth embodiment of the present invention. As shown in FIG. 13, the network system includes a LAN system 301, client terminals 302, 303, such as a personal computer or work station, connected to the LAN system 301, an ISDN 304 to which are connected facsimile machines 305, 306 capable of performing transmission/reception in the G4 mode, a pay-station telephone network 307 to which are connected facsimile machines 308, 309 capable of communication in the G3 mode, and a facsimile server device 310 for realizing facsimile transmission/reception according to this embodiment. The server device 310 performs allotted transmission of data from the LAN system 301 to the ISDN 304 and pay-station telephone network 307, as well as allotted transmission of data from the ISDN 304 and pay-station telephone network 307 to the LAN system 301.

Figure 14:
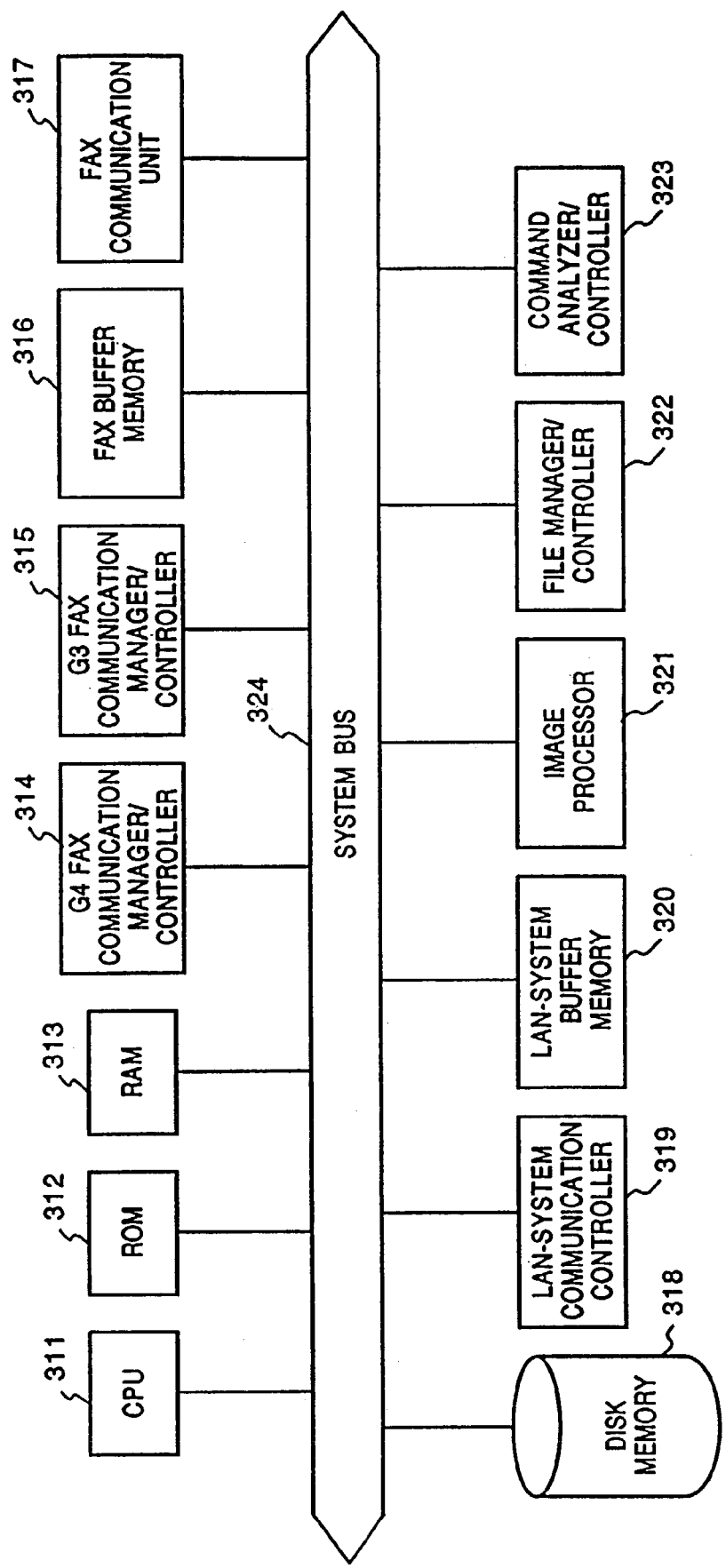
FIG. 14 is a block diagram showing the configuration of a facsimile server device according to the fourth embodiment.

FIG. 14 is a block diagram showing the configuration of the facsimile server device according to the fourth embodiment. As shown in FIG. 14, the server device includes a CPU 311 for performing overall control of the device in accordance with a control procedure (which includes a program corresponding to the flowchart of FIG. 16) stored in a ROM 312. The latter stores programs such as that mentioned above. A RAM 313 is used as the work area of the CPU 311. Also included are a G4 facsimile-communication manager/controller 314 for performing management/control in G4 facsimile communication, and a G3 facsimile-communication manager/controller 315 for performing management/control in G3 facsimile communication. These units perform management and control of G4/G3 facsimile communication (transmission and reception) and, at the time of reception, create page files in which the received facsimile data is managed every page that is received. A buffer memory 316 is for temporarily storing transmission/reception data at the time of G4/G3 facsimile data transmission/reception. The buffer memory 316 absorbs a difference is speed between the transmission speed of a disk file and network speed. A facsimile communication unit 317 actually transmits the G4/G3 facsimile data. A large-capacity disk memory 318 stores a data file created by an application in each client terminal, an MMR (modified-modified read)/MH (modified Huffman)/MR (modified read) format-data file received by the facsimile server 310 through facsimile communication, and the associated attribute information.

A controller 319 for communication within the LAN system performs communication protocol control within the LAN system. Data transmitted via the communication controller 319 is developed in a buffer memory 320 within the LAN system.

An image processor 321 converts a file, which has been requested for facsimile transmission from the client terminal 302 or 303, into a bit image, and further effects a conversion into an MMR/MH/MR data format, which is the data format of the facsimile transmission. The received data is stored in the disk memory 318 in the MMR/MH/MR data format, but a conversion into a bit image also may be performed in response to a service request from the client terminal.

A file manager/controller 322 is for managing a communication log file as well as a page file received through facsimile communication. A command analyzer and control unit 323 analyzes a service-request command sent from each client terminal. If the command is, say, a G4-facsimile transmission command, the unit 323 issues a communication request to the G4-facsimile communication controller 314. A system bus 324 connects the CPU 311 to the components 312 through 323.

Figure 15:
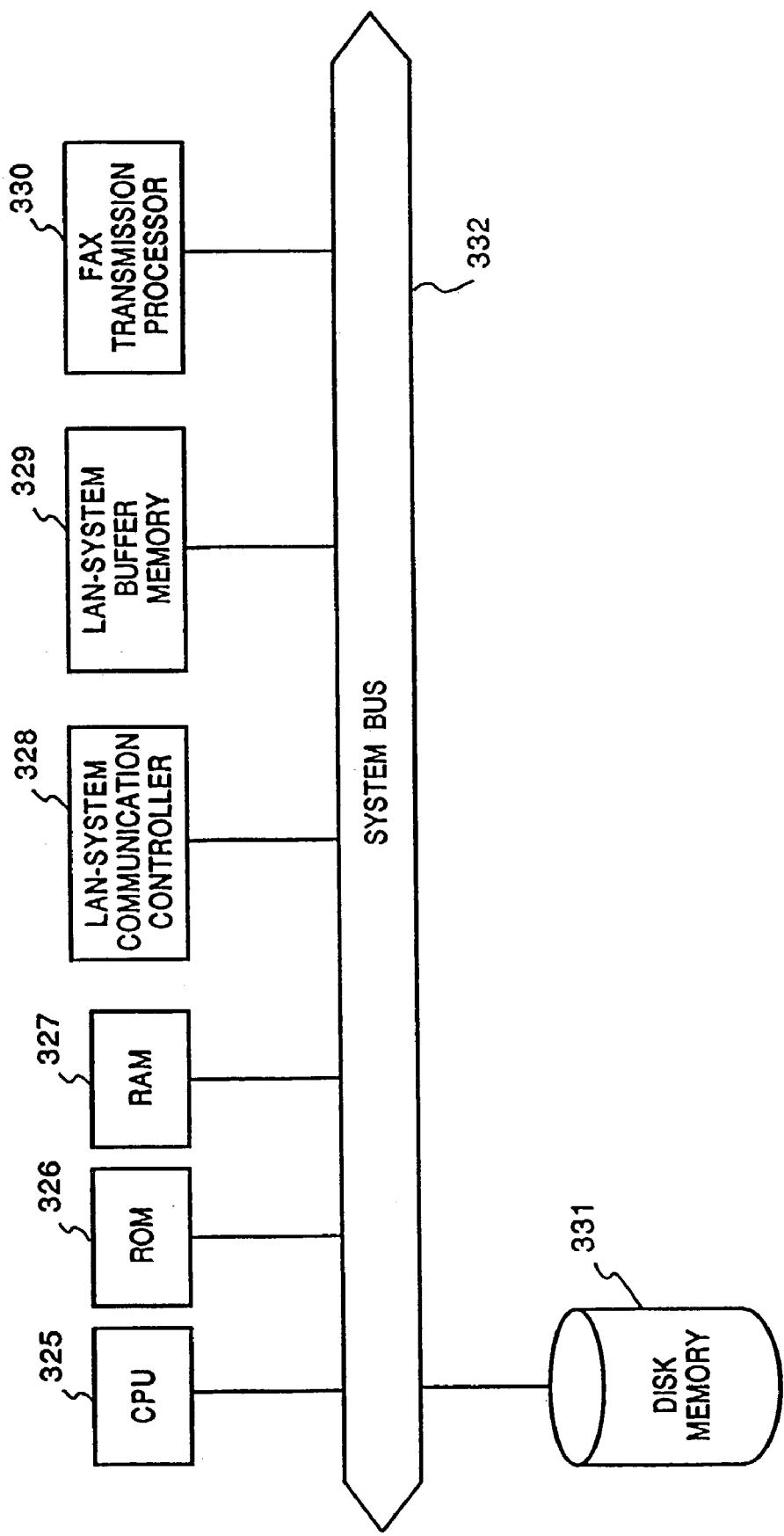
FIG. 15 is a block diagram showing the configuration of a client terminal according to the fourth embodiment.

FIG. 15 is a block diagram showing the construction of the client terminal according to this embodiment.

The client terminal includes a CPU 325 for controlling the overall apparatus in accordance with a control procedure stored in a ROM 326, which stores programs such as that mentioned above, and a RAM 327 used as a work area of the CPU 325. A controller 328 for communication within the LAN system performs communication protocol control within the LAN system. Data transmitted via the communication controller 328 is developed in a buffer memory 329 within the LAN system. A facsimile-transmission processor 330 sends transmission commands and the like to the server device facsimile server when a transmission operation is performed at the client terminal. Numeral 331 denotes a disk memory. A system bus 332 connects the CPU 325 to the components 326 through 331.

A facsimile transmission using the arrangement set forth above will now be described.

Figure 16:
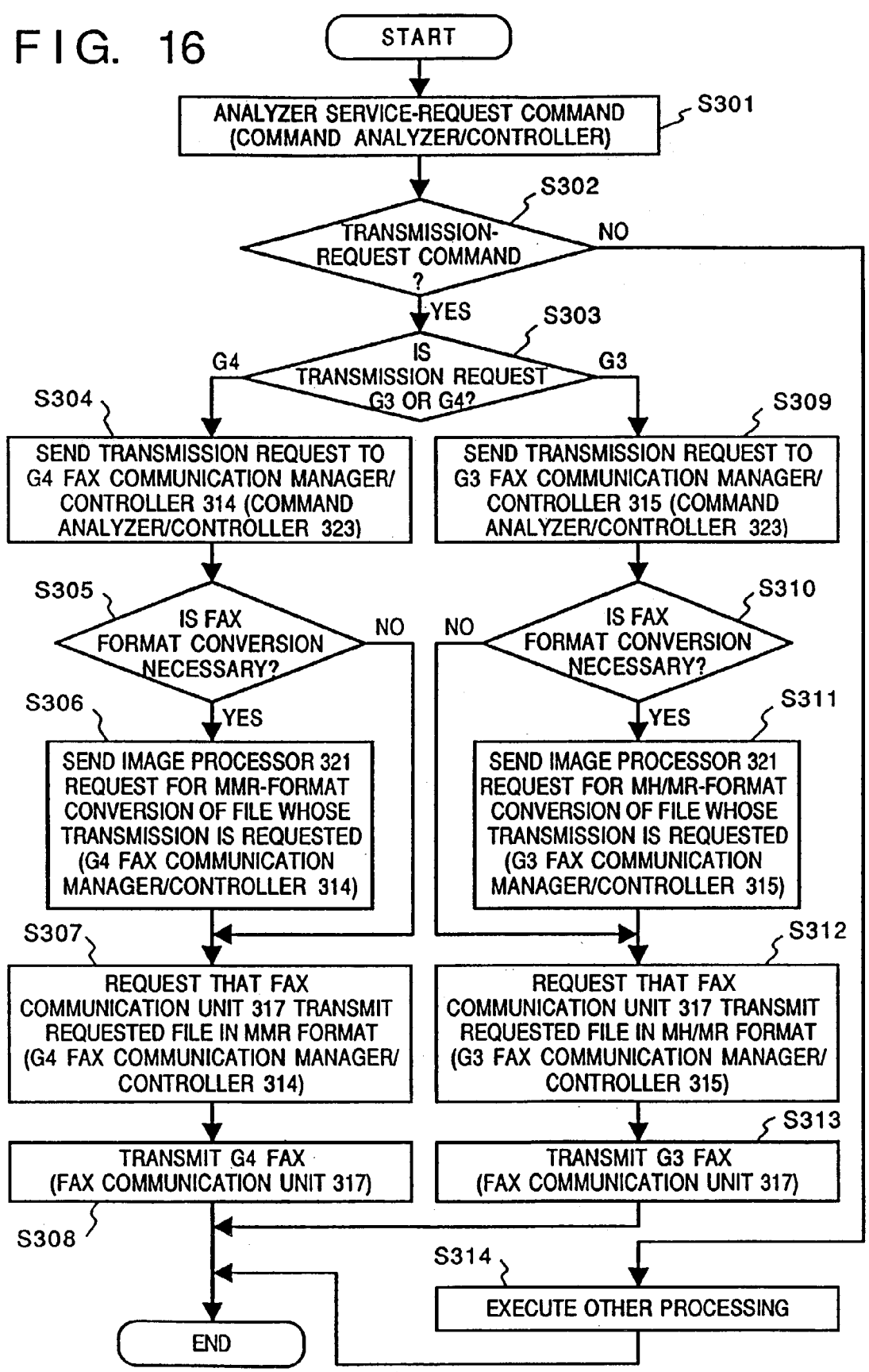
FIG. 16 is a flowchart for describing the facsimile transmitting operation of the facsimile server according to the fourth embodiment.

FIG. 16 is a flowchart for describing the operation of facsimile transmission performed by the facsimile server device according to this embodiment.

At step S301 of the flowchart, the command analyzer/controller 323 of the facsimile server 310 analyzes a service-request command when the command is received from each client terminal. Next, at step S302, it is determined whether the service-request command is a command requesting facsimile transmission. If the content of the service-request command is not that of a facsimile-transmission request, the program proceeds to step S314. Here other requested service processing is executed, after which processing is terminated. If it is determined at step S302 that the service-request command is a command requesting facsimile transmission, then it is determined at step S303 whether the request is indicative of G4 facsimile transmission or G3 facsimile transmission. In case of G4 facsimile transmission, the program proceeds to step S304, at which the command analyzer/controller 323 requests the G4 facsimile-communication manager/controller 314 to carry out a transmission. Next, at step S305, it is determined whether the file requested for facsimile transmission is required to undergo conversion of facsimile format. In case of G4 facsimile transmission, it is determined whether the file is an MMR file. If a conversion of facsimile format is required, the G4 facsimile-communication manager/controller 314 requests that the image processor 321 convert the file requested for facsimile transmission into a facsimile-format file at step S306. When the conversion into the facsimile-format file by the image processor 321 ends, it is requested at step S307 that the facsimile communication unit 317 perform a facsimile transmission. Next, at step S308, the facsimile communication unit 317 transmits the MMR file by facsimile communication to the telephone number which requested the transmission. Processing is then terminated. If it is determined at step S305 that the file requested for facsimile transmission does not require a facsimile-format conversion, then step S306 is skipped and the program proceeds to step S307, after which steps S307 and S308 are executed as set forth above.

If it is determined at step S303 that the command requesting facsimile transission is a request for G3 facsimile transmission, the program proceeds to step S309, at which the command analyzer/controller 323 requests the G3 facsimile-communication manager/controller 315 to carry out a transmission. Next, at step S310, it is determined whether the file requested for facsimile transmission is required to undergo conversion of facsimile format. In case of G3 facsimile transmission, it is determined whether the file is an MH/MR file. If a conversion of facsimile format is required, the G3 facsimile-communication manager/controller 315 requests that the image processor 321 convert the file requested for facsimile transmission into a facsimile-format file at step S311. When the conversion into the facsimile-format file by the image processor 321 ends, a facsimile-transmission request is sent to the facsimile communication unit 317 at step S312. Next, at step S313, the facsimile communication unit 317 transmits the MH/MR file by facsimile communication to the telephone number which requested the transmission. Processing is then terminated. If it is determined at step S310 that the file requested for facsimile transmission does not require a facsimile-format conversion, then step S311 is skipped and the program proceeds to step S312, after which steps S312 and S313 are executed as set forth above.

Facsimile reception will now be described.

Figure 17:
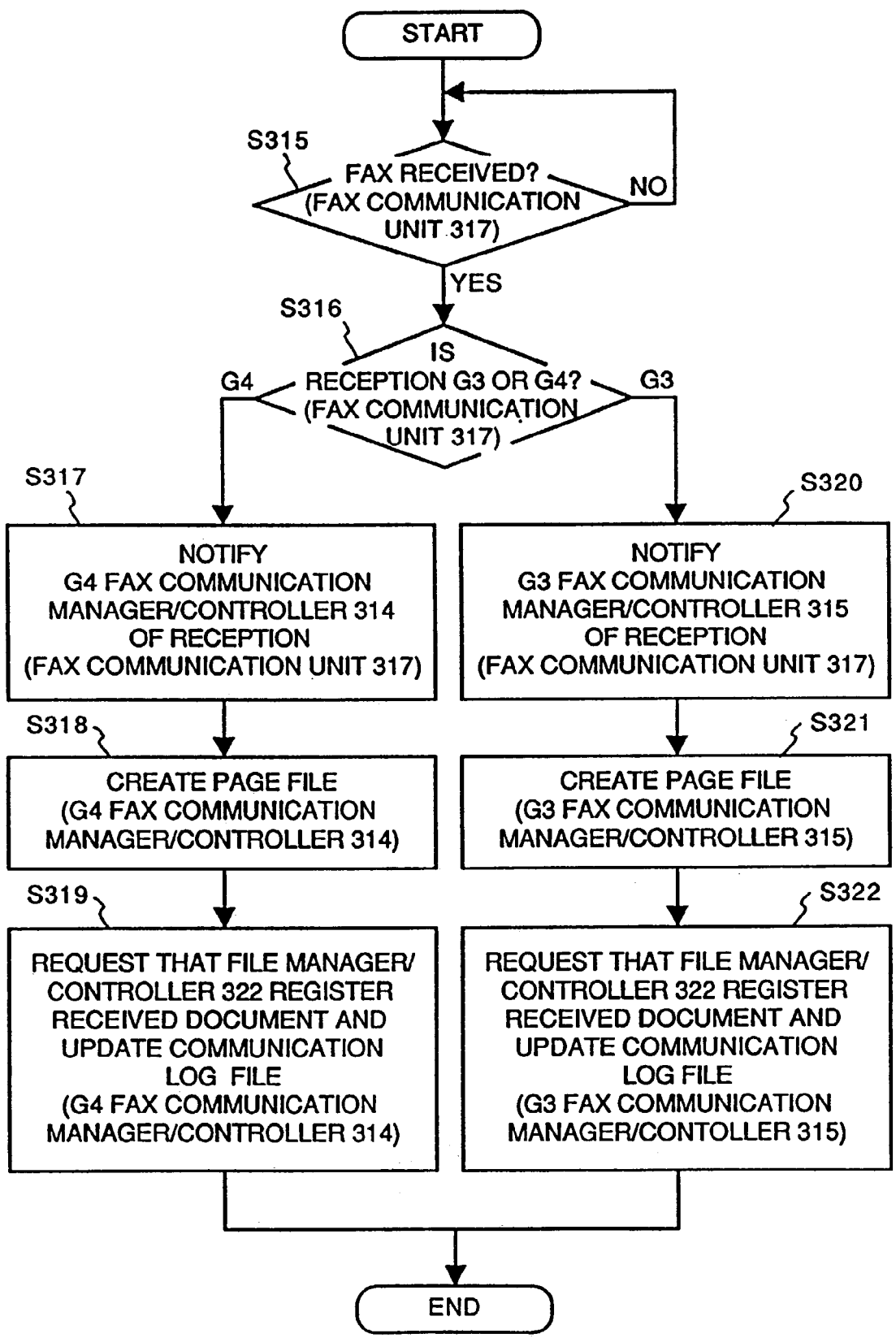
FIG. 17 is a flowchart for describing the facsimile receiving operation of the facsimile server according to the fourth embodiment.

FIG. 17 is a flowchart for describing the operation of facsimile reception performed by the facsimile server device according to this embodiment.

At step S315 of the flowchart, the facsimile communication unit 317 waits for reception of a facsimile signal. If the signal is not received, the program returns to step S315 to form a permanent loop. If a facsimile signal is received at step S315, then, at step S316, the facsimile communication unit 317 determines whether reception is G4 facsimile or G3 facsimile. If it is determined that reception is in the G4 facsimile mode, then the program proceeds to step S317. Here the facsimile communication unit 317 notifies the G4 facsimile-communication manager/controller 314 of the fact that G4 facsimile reception has occurred. At step S318, the G4 facsimile-communication manager/controller 314, notified of G4 facsimile reception at step S317, creates a page file for managing the received facsimile data page by page. This is followed by step S319, at which the G4 facsimile-communication manager/controller 314 requests that the file manager/controller 322 register the page file created at step S318 and update the communication log file. Processing is then terminated.

If the facsimile communication unit 317 determines at step S316 that reception is in the G3 facsimile mode, the program proceeds to step S320. Here the facsimile communication unit 317 notifies the G3 facsimile-communication manager/controller 315 of the fact that G3 facsimile reception has occurred. At step S321, the G3 facsimile-communication manager/controller 315, notified of G3 facsimile reception at step S320, creates a page file for managing the received facsimile data page by page. This is followed by step S322, at which the G3 facsimile-communication manager/controller 315 requests that the file manager/controller 322 register the page file created at step S321 and update the communication log file. Processing is then terminated.

Thus, in accordance with the fourth embodiment, as described above, G4 and G3 facsimile transmission/reception functions possessed by the facsimile server device can be shared by virtue of a service request command from each client terminal arranged in the LAN. In addition, by placing the facsimile transmission/reception in the facsimile server device, the load upon the client terminals can be alleviated. Furthermore, facsimile transmission/reception from the client terminals of the LAN can be managed by the facsimile server device.

The present invention can be modified by providing the facsimile communication unit 317 of FIG. 14 in an external device rather than in the server device. For example, an arrangement can be adopted in which the facsimile communication unit is connected via an SCSI (small computer system interface), which is the standard interface of a personal computer or work station.

<Fifth Embodiment>

Figure 18:
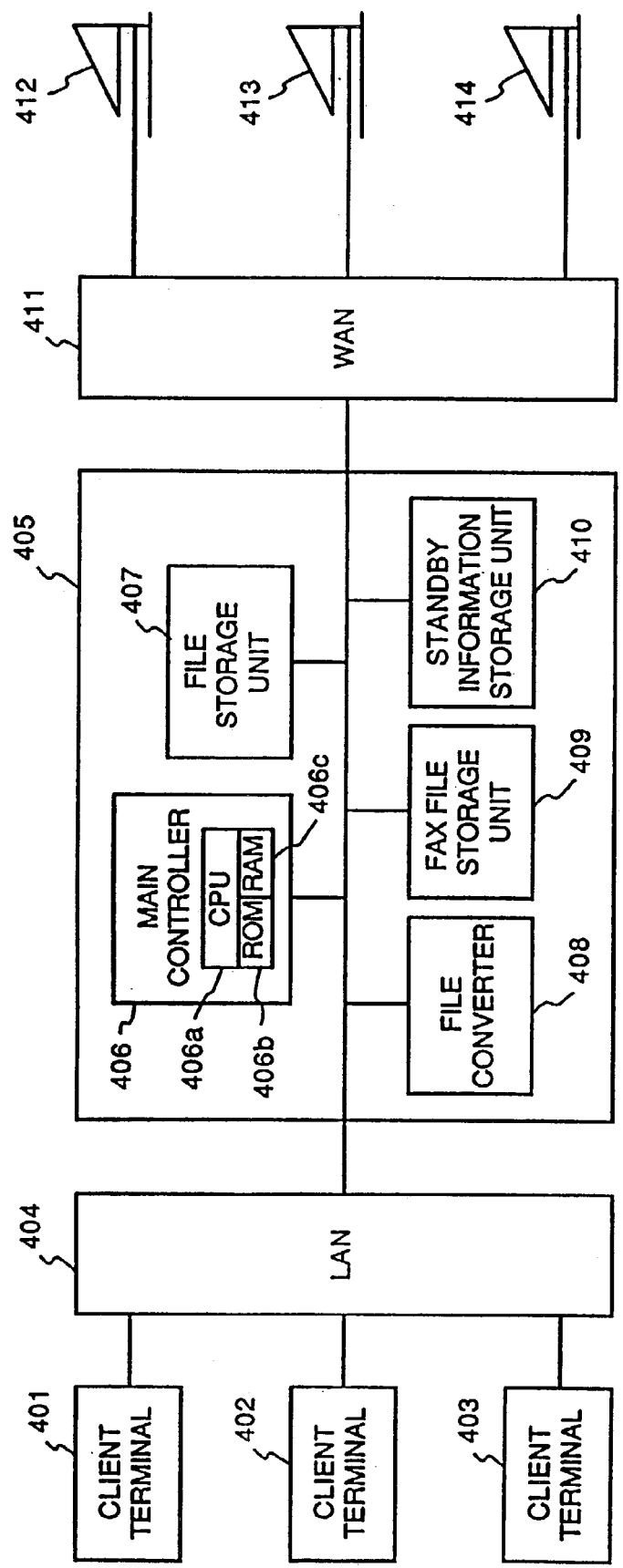
FIG. 18 is a block diagram showing the configuration of a client-server facsimile system according to a fifth embodiment of the present invention.

FIG. 18 is a block diagram showing the configuration of a client-server facsimile system according to a fifth embodiment of the present invention. Shown in FIG. 18 are client terminals 401~403, which are personal computers or work stations, a LAN 404, a server device 405, a WAN 411, and G4 facsimile terminals 412~414.

The server device 405 includes a main controller 406 for controlling the overall device. The main controller 406 has a CPU 406a operated by a program, a ROM 406b storing a control program (which includes a program in accordance with the flowchart shown in FIG. 20) executed by the CPU 406a, and a RAM 406c used as a work area for various programs. A file storage unit 407 stores a file read in from a client terminal. This file includes various files, such as a TEXT file and TIFF (tag image file format) file. A file converter 408 converts the TEXT file or TIFF file into an MMR file or converts the MMR file into a TIFF file. A facsimile-file storage unit 409 stores an MMR file in advance. A standby-information storage unit 410 stores information from a client who has requested registration of facsimile data. A WAN [which includes a digital data network, leased line, telephone ISDN (integrated service digital network), etc.] and a LAN, etc., are connected to the server device 405 comprising the main controller 406, file storage unit 407, file converter 408, facsimile-file storage unit 409 and standby-information storage unit 410.

Figure 19:
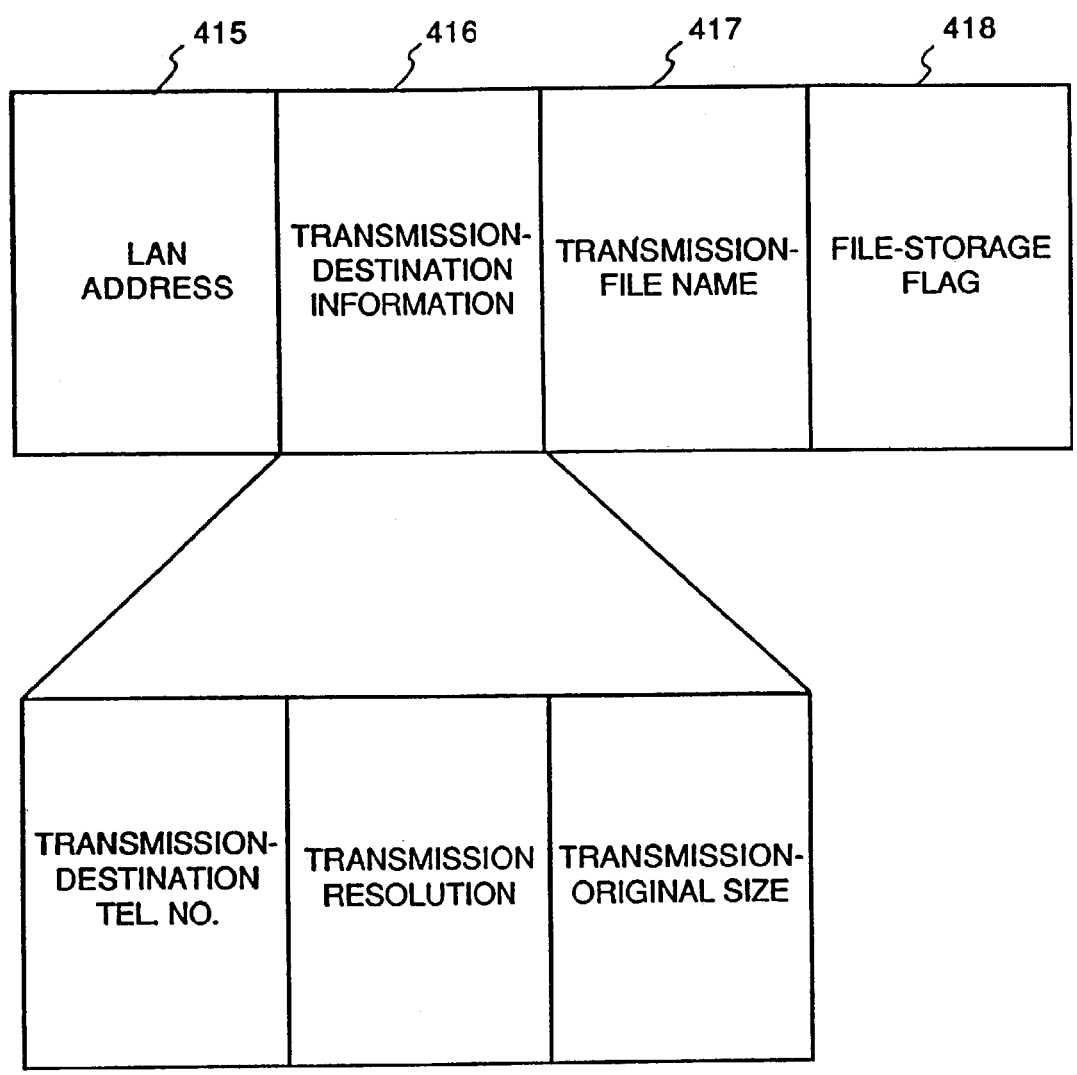
FIG. 19 is a diagram for describing standby information according to this embodiment.

FIG. 19 is a diagram for describing the standby information of this embodiment. The standby information is an information group stored in the standby-information storage unit 410. Shown in FIG. 19 are a LAN address 415 of a client who has requested registration of facsimile data, a transmission destination information 416, such as a telephone number which is the destination of a transmission, transmission resolution and the size of a transmitted original, a transmission-file name 417, and a flag 418 indicating whether a file has been stored in the file storage unit 407.

The operation of this embodiment will now be described.

Figure 20:
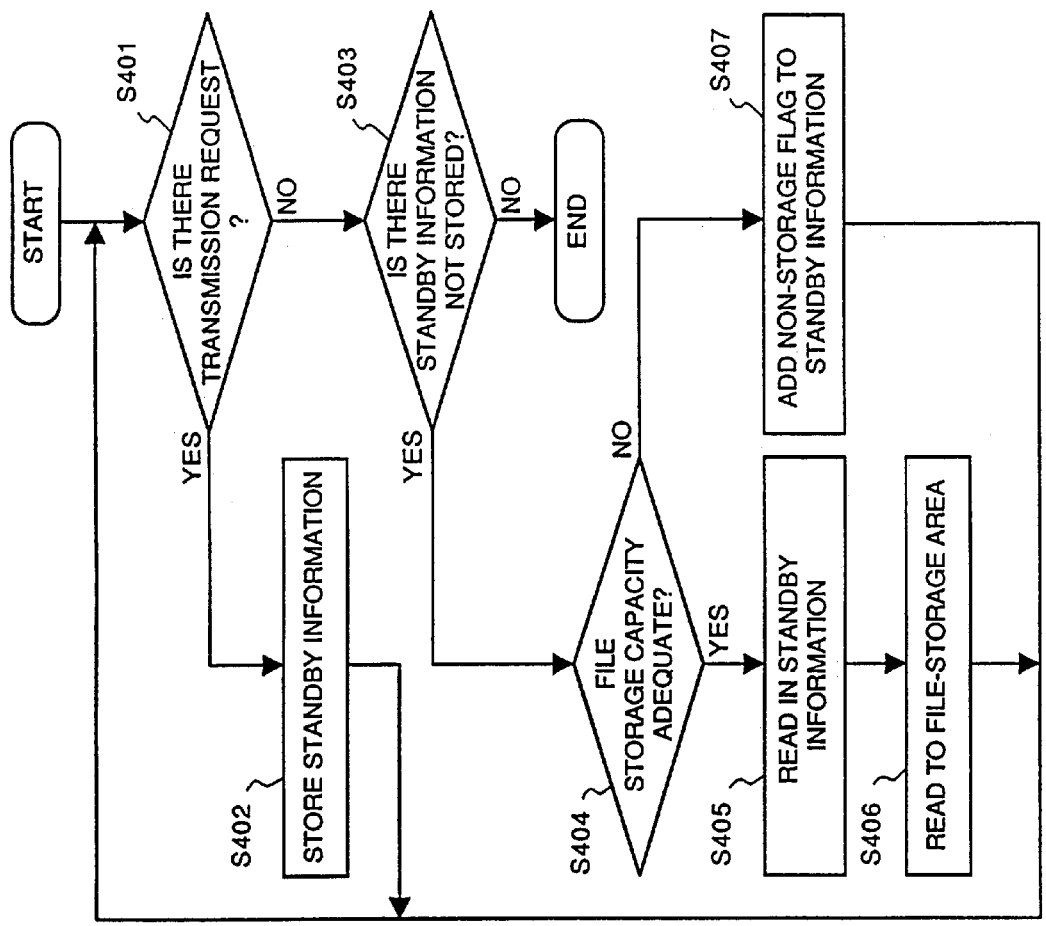
FIG. 20 is a flowchart for describing the operation of the client-server facsimile system according to the fifth embodiment.

FIG. 20 is a flowchart for describing the client-server facsimile operation according to this embodiment.

As set forth above, the server device 405 executes processing, described below, under the control of the main controller 406 (CPU 406a). In the description that follows, a case in which the client 401 transmits a file to the server device 405 will be taken as an example.

First, the client 401 attempting facsimile transmission designates the transmission file. Next, the telephone number of the destination of the transmission is designated. If necessary, various service functions are set, such as transmission resolution and the size of the transmission original. A transmission command is then issued.

At step S401 of the flowchart in FIG. 20, the server device 405 receives a request for facsimile transmission from the client terminal 401. The request is delivered in the form of standby information comprising the LAN address, information indicative of the destination of transmission, transmission-file name and file-storage flag. If a transmission request has been made, then the standby information is stored in the standby-information storage unit 410 at step S402. The program the returns to step S401 and this processing is repeated. Even if transmission requests are made by a plurality of clients simultaneously, the requests are stored as a queue in the standby-information storage unit 410 by virtue of this processing, and therefore an error message is not sent back.

If it is determined at step S401 that there has been no transmission request, then the file-storage flag 418 in the standby-information storage unit 410 is referred to at step S403 to determine whether there is data not stored in the file storage unit 407. If there is no unstored data, or if there is no standby information per se, then processing is terminated.

In a case where there is data not yet read in, it is determined at step S404 whether the capacity of the file storage unit 407 is enough to read in the transmission file. If the capacity is adequate, then processing set forth below is executed with regard to the standby information data starting from the oldest transmission request or from the highest order of priority.

In a case where a response is made to the transmission request from a certain client terminal, the standby information is read in at step S405, the LAN address of the client terminal which has requested the transmission is obtained, and so is name of the file to be transmitted. Then, at step S406, the designated transmission file is read in the file storage unit 407 from the client who has made the request.

In a case where the file capacity is found to be inadequate at step S404, the file-storage flag 418 of the standby information is set to indicate non-storage at step S407. The file for which the flag indicative of non-storage has been set does not undergo actual transmission processing until the file capacity becomes adequate.

Thereafter, the program returns to step S401 and processing is repeated.

In transmission processing, the file in the file storage unit 407 is sequentially converted into a facsimile data format and is transmitted just as instructed by the standby information. As soon as transmission ends, the standby information is removed from the standby-information storage unit 410, the transmission file is removed from the file storage unit 407, and the next file in the file storage unit 407 is processed again in the same manner.

In accordance with the fifth embodiment, as described above, if there are transmission requests from a plurality of clients simultaneously, a client to which a busy signal is sent back need not make the request again and again a number of times; only a single operation is required to achieve transmission. Thus, less labor is required of the operator on the client side.

It should be noted that the standby-information storage unit 410 need not be provided solely in the server but can be provided also on the client side. More specifically, in a case where the client requests the server for a facsimile transmission and is sent back a busy signal, the information 416 indicative of the destination of the transmission is saved in a predetermined directory, and the LAN address 415 and transmission-file name 417 are recorded in the server. Then, at the end of one processing cycle, the server reads in the transmission document and transmission information successively from the clients which have requested transmission.

By virtue of the foregoing operation, the load upon the server device is alleviated when facsimile data is transmitted.

<Sixth Embodiment>

Figure 21:
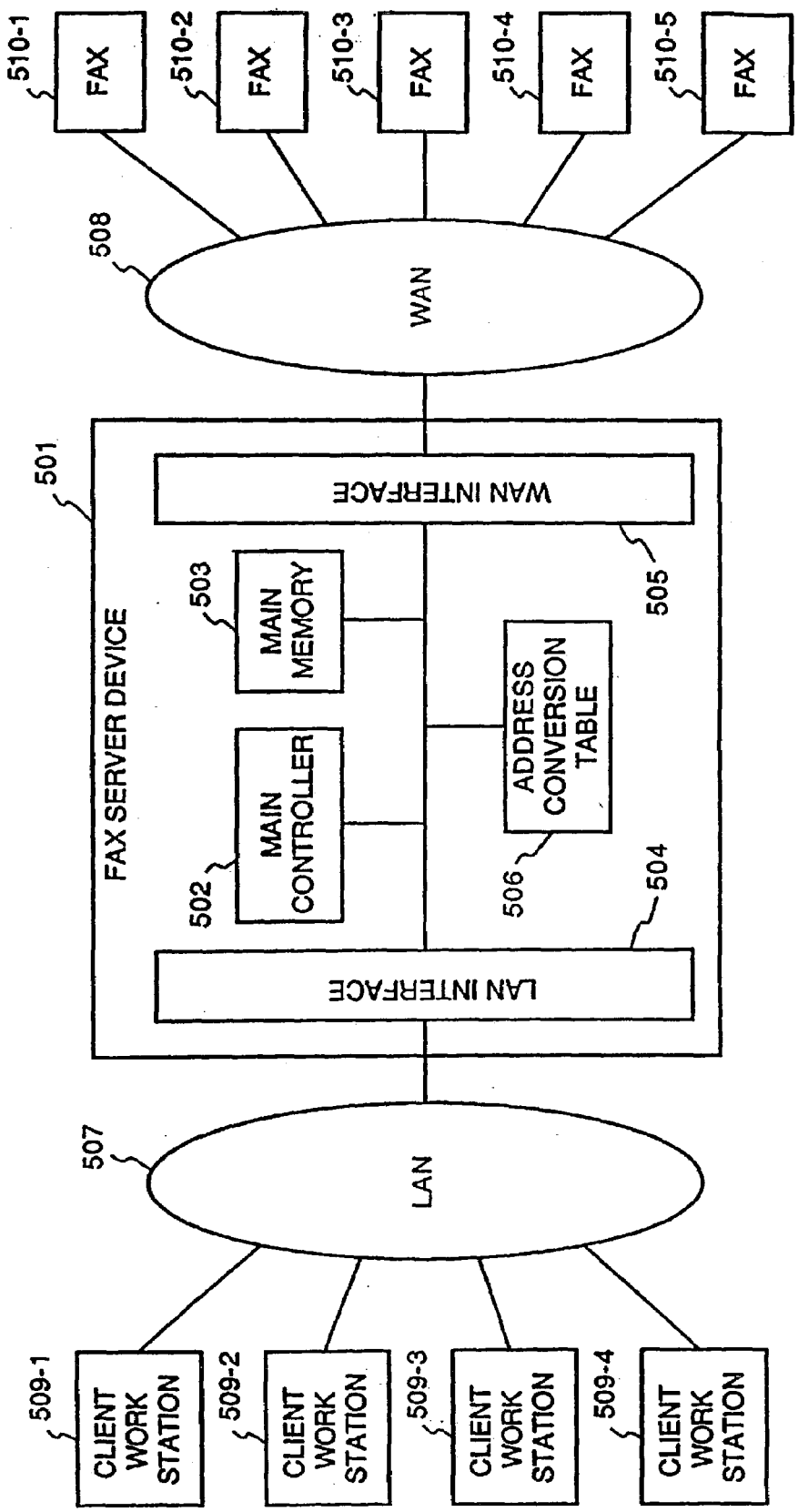
FIG. 21 is a block diagram showing the configuration of a client-server facsimile system according to a sixth embodiment of the present invention.

FIG. 21 is a block diagram showing the configuration of a client-server facsimile system according to a sixth embodiment of the present invention. Shown in FIG. 21 are a facsimile server device 501, which has a main controller 502, a main memory 503, a LAN interface 504 for controlling communication with a LAN 507, a WAN interface 505 for controlling communication with a WAN 508, and a conversion table 506 for conversion between a line number on the WAN side and an IP (internet protocol) address on the LAN side. The contents of the conversion table 506 is as indicated in the following table:

TABLE 1

| SUBADDRESS | IP ADDRESS |
| --- | --- |
| 0001 | 30.0.0.1, 30.0.0.7. |
| 0002 | 30.0.0.2, 30.0.1.2. |
| 0003 | 30.0.0.3 |
| 0004 | 30.0.0.4 |

The IP addresses, which are numerical values expressed by binary numbers of 32 bits, are assigned to the terminals, which are connected to the LAN, in order that these terminals may be uniquely distinguished from one another. The IP addresses are used in a LAN employing the internet protocol. In FIG. 21, numerals 509-1 through 509-4 denote client work stations connected to the facsimile server 501 by the LAN, and 510-1 through 510-5 denote facsimile machines connected to pay-station network.

Figure 22:
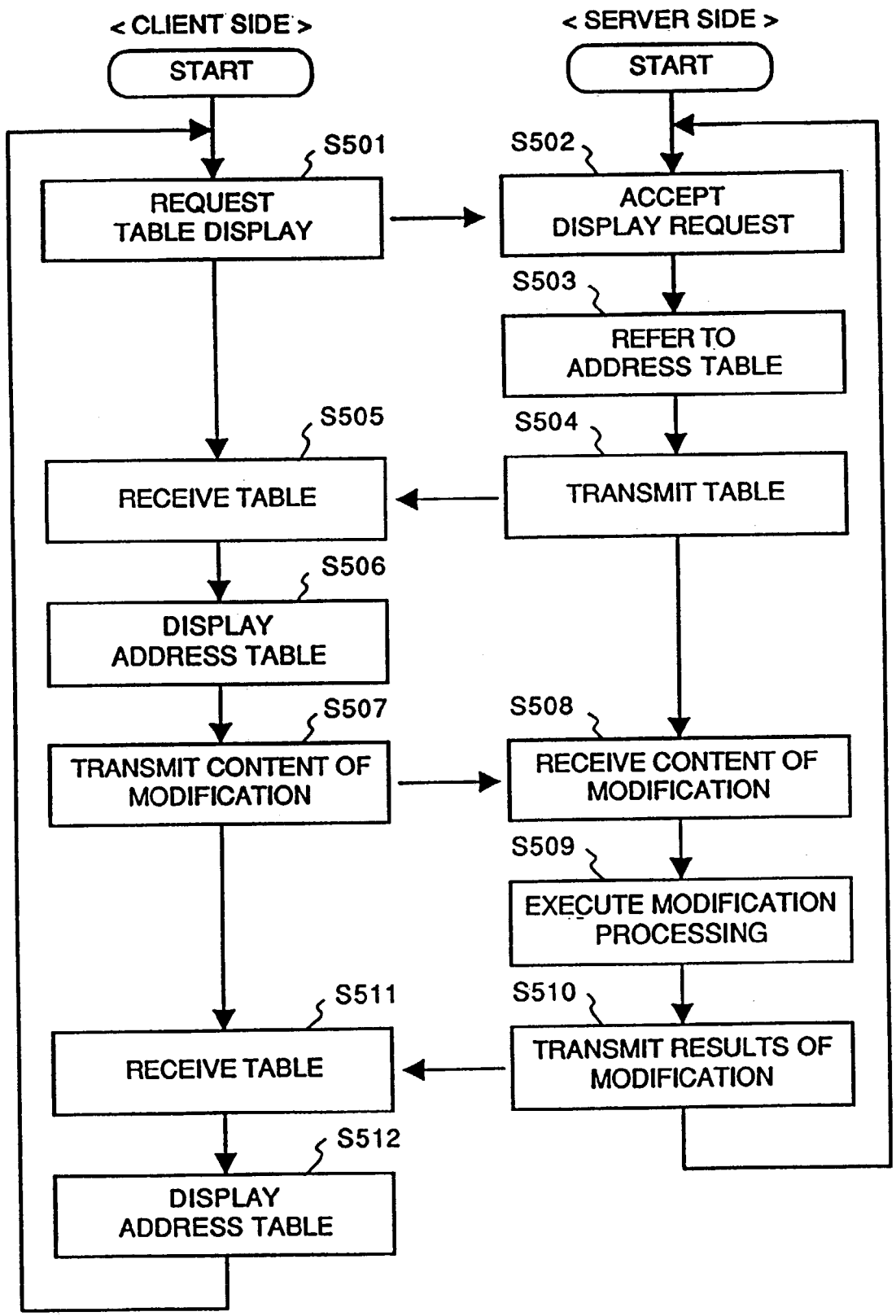
FIG. 22 is a flowchart for describing the operation of the system between the client side and the server side according to the sixth embodiment.

FIG. 22 is a flowchart for describing the operation of the system between the client side and the server side in the sixth embodiment. In the initial state, the side of the facsimile server waits for receipt of a table-display request from a facsimile client at step S502, and the client side waits for a table-display selection input from the user at step S501.

When the user selects a display table of a client, the client sends a table-display request at step S501 and waits for receipt of the table from the server at step S505.

The server accepts the request from the client at step S502, refers to the address table at step S503, sends the result to the client at step S504 and waits for receipt of modified content in the table at step S508. Types of table modification are as shown in the following table:

TABLE 2

| TYPE OF MODIFICATION |
| --- |
| ADD RECORD |
| DELETE RECORD |
| CHANGE RECORD |

The client receives the table from the server at step S505, displays the table on the display screen at step S506 and waits for a modification input from the user at step S507. The user observes the displayed table and inputs a change in table content. The client transmits the inputted modification to the server at step S507 and then waits for receipt of the table from the server at step S511.

The server receives the modification from the client at step S508 and actually performs processing for modifying the table at step S509. When modification of the table ends, the modified table content is transmitted to the client at step S510 and the program returns to step S502, where the server side waits for receipt of the table-display request.

The client receives the result of table modification at step S511 and displays the address table at step S512, at which the program returns to step S501 for input of the table-display selection.

Thus, in accordance with the sixth embodiment, as described above, it is possible for a table in the server device to be modified from the side of the client terminal. As a result, a user employing a client work station need no longer go to the location of the server device because of a modification in the address conversion table provided at the server work station. This saves time and makes it unnecessary to suspend work being performed at the client terminal. In addition, since the server device need not be operated directly, the operation for modifying the table can be performed by anyone, without the server device being adversely affected, when the manager of the server system is absent. The server table modification can be performed quickly, and the operation for carrying out the modification is left to the user. As a result, the management burden upon the manager of the server system is alleviated.

<Seventh Embodiment>

A seventh embodiment will now be described.

Figure 23:
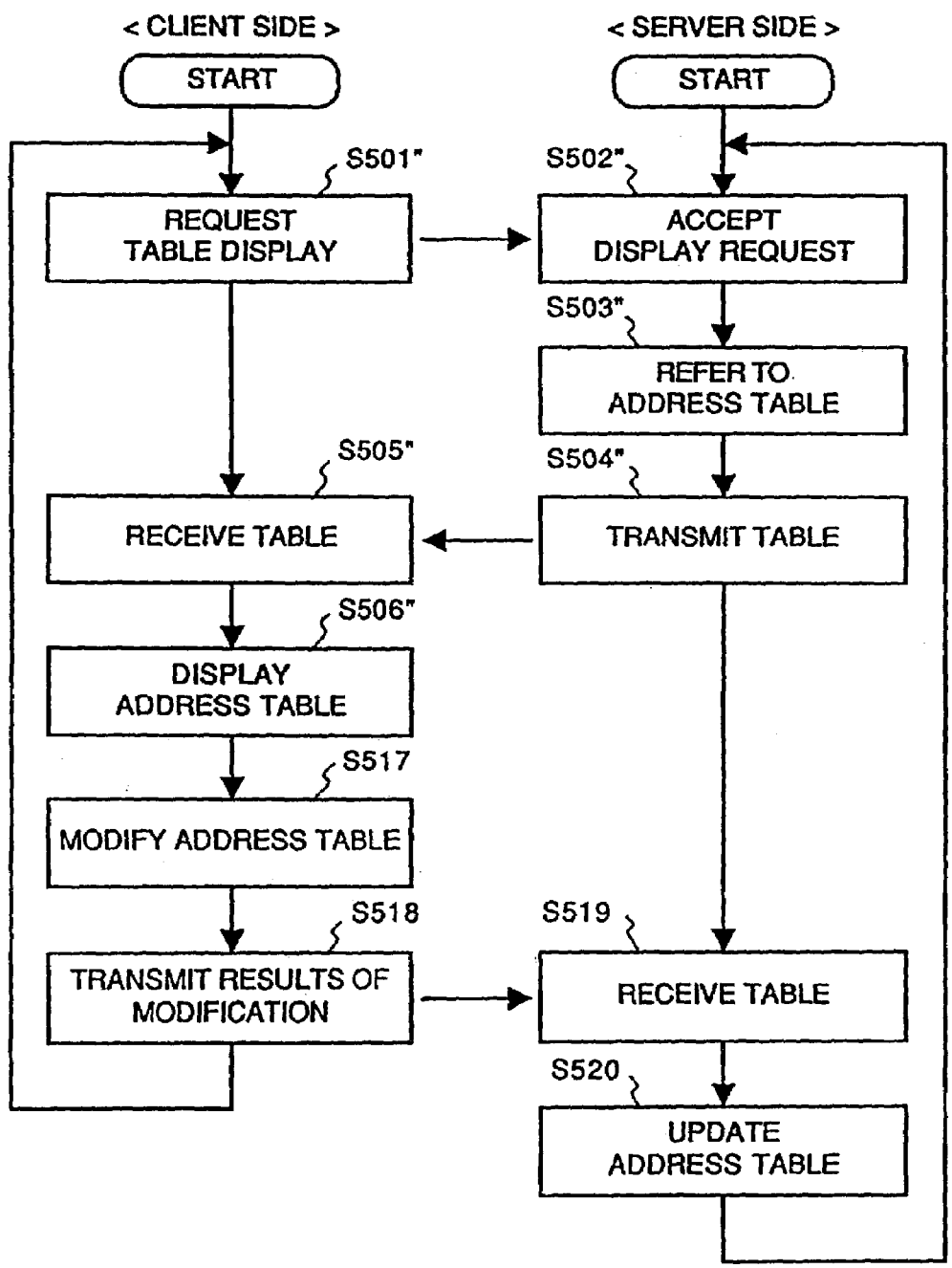
FIG. 23 is a flowchart for describing the operation of the system between the client side and the server side according to a seventh embodiment.

FIG. 23 is a flowchart for describing the operation of the system between the client side and the server side in the seventh embodiment. Steps in FIG. 23 whose processing is identical with the processing of steps in the flowchart of FIG. 22 are designated by like step numbers.

In the initial state, the side of the facsimile server waits for receipt of a table-display request from a facsimile client at step S502", and the client side waits for a table-display selection input from the user at step S501".

When the user selects a display table of a client, the client sends a table-display request at step S501" and waits for receipt of the table from the server at step S505".

The server accepts the request from the client at step S502", refers to the address table at step S503", sends the result to the client at step S504" and waits for results of modification in the table at step S519.

The client receives the table from the server at step S505", displays the table on the display screen at step S506", after which the address table is modified at step S517 in accordance with the input from the user.

The client sends the modified results to the server at step S518, at which the program returns to step S501" for input of the table-display selection.

The server receives the results of modification from the client at step S519 and updates the table at step S520, after which the program returns to step S502", where the server side waits for receipt of the table-display request.

By virtue of the foregoing operation, the address conversion table located at the server work station can be modified from the side of the client work station.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus comprising:
a linker adapted to link to a plurality of data terminals, each of which is able to store data to be processed;
receiving means for receiving a processing request from at least one of the plurality of data terminals without any request from said apparatus, wherein the processing request includes information for specifying data to be processed that is predesignated by a data terminal and information for discriminating the data terminal from the plurality of data terminals;
a determiner adapted to determine whether predetermined resources are adequate to perform the received processing request;
a manager adapted to manage information for discriminating which data terminal of the plurality of data terminals has stored therein data to be processed corresponding to the received processing request;

requesting means for issuing an output request to the discriminated data terminal for the data to be processed stored in the discriminated data terminal, based on the managed information, when the predetermined resources are adequate to perform the received processing request;

receiving means for receiving the data to be processed, which is output from the discriminated data terminal, in accordance with the output request issued by said requesting means; and a processor adapted to process the data received by said means for receiving the data to be processed, based on the received processing request.

2. The apparatus according to claim 1, wherein said linker connects to a local-area network to which one or more terminals are connected.

3. The apparatus according to claim 2, wherein the received processing request includes network information, which specifies a terminal connected to the local-area network; and wherein said requesting means issues the request based on the network information.

4. The apparatus according to claim 2, further comprising a storage unit adapted to store the data received by said means for receiving the data to be processed, wherein said determiner makes a determination based on an available storage capacity of said storage unit.

5. The apparatus according to claim 1, wherein said processor transmits the data received by said means for receiving the data to be processed in accordance with transmission information included in the received processing request.

6. A data processing method of an apparatus linked to a plurality of data terminals, each of which is able to store data to be processed, said method comprising the steps of:

receiving a processing request from at least one of the plurality of data terminals without any request from the apparatus, wherein the processing request includes information for specifying data to be processed that is predesignated by a data terminal and information for discriminating the data terminal from the plurality of data terminals;

determining whether predetermined resources are adequate to perform the received processing request;

managing information for discriminating which data terminal has stored therein data to be processed corresponding to the received processing request;

requesting the data to be processed stored in the discriminated data terminal to the discriminated data terminal, based on the managed information, when the predetermined resources are adequate to perform the received processing request;

receiving the data to be processed, which is output from the discriminated data terminal, requested in said output requesting step; and processing the received data based on the received processing request.

7. A data processing apparatus comprising:

a linker adapted to link to a plurality of data terminals, each of which is able to store data to be processed;

receiving means for receiving a processing request from at least one of the plurality of data terminals without any request from said apparatus, wherein the processing request includes information for specifying data to be processed that is predesignated by a data terminal and information for discriminating the data terminal from the plurality of data terminals;

a determiner adapted to determine whether predetermined resources are adequate to store data concerning the received processing request;

a manager adapted to manage information for discriminating which data terminal of the plurality of data terminals has stored therein data to be processed corresponding to the received processing request;

requesting means for issuing an output request to the discriminated data terminal for the data to be processed stored in the discriminated data terminal, based on the managed information, when the predetermined resources are adequate to store data concerning the received processing request;

receiving means for receiving the data to be processed, which is output from the discriminated data terminal, in accordance with the output request issued by said requesting means; and a processor adapted to process the data received by said means for receiving the data to be processed, based on the received processing request.

* * * * *

UNITED STATES PATENT AND TRADEMARK OFFICE
CERTIFICATE OF CORRECTION

PATENT NO. : 7,110,134 B2
APPLICATION NO. : 10/428082
DATED : September 19, 2006
INVENTOR(S) : Keiichi Iimoto et al.

It is certified that error appears in the above-identified patent and that said Letters Patent is hereby corrected as shown below:

COLUMN 3:

Line 19, "a" should read --for receiving a--; and
Line 21, "from the" should read --from the apparatus,--;
Line 23, "treminals" should read --terminal--;
Line 24, "iformation" should read --information--;
Line 29, "terminal" should read --terminals--;
Line 31, "mean" should read --means--; and
Line 36, "mean" should read --means--.

COLUMN 4:

Line 27, "dr" should be deleted.

COLUMN 5:

Line 61, "is" should read --in--.

COLUMN 7:

Line 28, "is" should read --in--.

COLUMN 8:

Line 57, "is" should read --in--.

UNITED STATES PATENT AND TRADEMARK OFFICE
CERTIFICATE OF CORRECTION

PATENT NO. : 7,110,134 B2
APPLICATION NO. : 10/428082
DATED : September 19, 2006
INVENTOR(S) : Keiichi Iimoto et al.

It is certified that error appears in the above-identified patent and that said Letters Patent is hereby corrected as shown below:

<u>COLUMN 10</u>:

Line 31, "is" should read --in--.

Signed and Sealed this

Nineteenth Day of June, 2007

JON W. DUDAS
*Director of the United States Patent and Trademark Office*